(12) United States Patent
Hakomori

(10) Patent No.: US 7,068,327 B2
(45) Date of Patent: Jun. 27, 2006

(54) VIDEO ENCODER AND IMAGE PROCESSING SYSTEM USING SAME

(75) Inventor: Atsushi Hakomori, Chiba (JP)

(73) Assignee: Sony Corporation (JP)

( * ) Notice: Subject to any disclaimer, the term of this patent is extended or adjusted under 35 U.S.C. 154(b) by 650 days.

(21) Appl. No.: 10/292,526

(22) Filed: Nov. 13, 2002

(65) Prior Publication Data

US 2003/0112365 A1    Jun. 19, 2003

(30) Foreign Application Priority Data

Nov. 14, 2001    (JP) .......................... P2001-349024

(51) Int. Cl.
*H04N 9/65* (2006.01)
*H04N 9/67* (2006.01)
*H04N 9/64* (2006.01)

(52) U.S. Cl. ...................... 348/642; 348/659; 348/599; 348/708

(58) Field of Classification Search ................ 348/469, 348/578, 598, 599, 659–661, 712, 713, 708, 348/642, 692, 695; H04N 7/04, 9/74, 9/67, H04N 9/64, 9/65
See application file for complete search history.

(56) References Cited

U.S. PATENT DOCUMENTS

| | | | | |
|---|---|---|---|---|
| 5,555,030 A | * | 9/1996 | Takamoto et al. | 348/642 |
| 5,638,135 A | * | 6/1997 | Mukai | 348/642 |
| 6,014,176 A | * | 1/2000 | Nayebi et al. | 348/584 |
| 6,052,156 A | * | 4/2000 | Mukai et al. | 348/642 |
| 6,055,019 A | * | 4/2000 | Takahashi | 348/642 |

\* cited by examiner

*Primary Examiner*—Sherrie Hsia

(74) *Attorney, Agent, or Firm*—Rader, Fishman & Grauer PLLC; Ronald P. Kananen

(57) ABSTRACT

A video encoder capable of adjusting output levels and more effectively utilizing performances of later devices, provided with a level adjustment circuit for adjusting output levels of an input luminance signal, color signal, and composite video signal by adding DC offset in accordance with a value set in a register or the like in advance and outputting the same to a display device, and an image processing system using the same.

5 Claims, 24 Drawing Sheets

FIG. 5

LPF FOR Y (CVBS)

| MODE | FC | h(n) FRONT STAGE (13TAPS, LATENCY=7) | h(n) REAR STAGE (23TAPS, LATENCY=12) |
|---|---|---|---|
| 0 | 6MHz | 0 0 0 1 2 4 2 4 2 1 0 0 0 /16 | 0 0 0 0 0 0 -1 -1 1 4 2 4 1 -1 -1 0 0 0 0 0 0 0 /8 |
| 1 | 3MHz | 0 1 1 1 2 2 2 2 2 1 1 1 0 /16 | 0 0 -2 -1 0 0 2 2 2 2 2 2 2 2 2 2 2 0 0 -1 -2 0 0 /16 |

LATENCY = 7+1+12+1 = 21 (CLOCKS)

FIG. 8 lpf_YS.t16.v: LPF FOR Y(S)

| MODE | fc | h(n) FRONT STAGE (13TAPS, LATENCY=7) | h(n) REAR STAGE (23TAPS, LATENCY=12) |
|---|---|---|---|
| - | 6MHz | 0 0 0 2 4 8 8 4 2 0 0 0 /32 | 0 0 0 0 0 0 0 -1 -1 1 4 2 4 1 -1 -1 0 0 0 0 0 0 /8 |

LATENCY = 7+1+12+1 = 21 (CLOCKS)

FIG. 11

| TAP NUMBER | SMALL ←--------→ LARGE |
|---|---|
| ATTENUATION<br><br>SHARPNESS NEAR fc<br><br>PASS BAND RIPPLE AMPLITUDE<br><br>PASS BAND RIPPLE WAVE NUMBER | SMALL ←--------→ LARGE<br><br>GENTLE ←--------→ SHARP<br><br>LARGE ←--------→ SMALL<br><br>SMALL(0) ←--------→ LARGE |

VIDEO ENCODER AND IMAGE PROCESSING SYSTEM USING SAME

BACKGROUND OF THE INVENTION

1. Field of the Invention

The present invention relates to a video encoder including a signal combining circuit for generating a composite video signal by combining a luminance signal and color signal and an image processing system using the same.

2. Description of the Related Art

In general, a video encoder uses a signal combining circuit shown in FIG. 23 in order to generate a composite video signal including a luminance signal Y and a color signal C.

This combining circuit mixes the luminance signal Y input from a terminal T1 and the color signal C input from a terminal T2 by a mixer 1 to generate a composite video signal Sc.

FIGS. 24A to 24C show waveforms of parts of the color signal C, the luminance signal Y, and the composite video signal Sc generated from these signals.

The luminance signal Y, as shown in FIG. 24B, includes a horizontal synchronization signal HSYNC and a signal LMNS indicating the video luminance.

The color signal C, as shown in FIG. 24B, includes a color burst signal CBRST and a carrier color signal CARC.

The color burst signal CSRST becomes a phase reference of the carrier color signal CARC. A TV receiver or a video monitor uses the color burst signal CBRST to control the phase of the color sub carrier oscillator and reproduces three primary color signals R, G, B (red, green, blue) by the generated color sub carrier and the carrier color signal CARC.

Note that an actual color burst signal CBRST is comprised of 8 to 12 cycles of the color sub carrier frequency. FIGS. 24A to 24C show the concept thereof. This is different from the actual waveform.

As shown in FIG. 24C, the color burst signal CBRST of the color signal C is superimposed on a back porch PRCH of the luminance signal Y by the combining circuit 1, while the carrier color signal CARC is superimposed on the video luminance signal LMNS.

In the NTSC signal system, the frequency of the color burst signal CBRST and the carrier color signal CARC is 3.58 MHz. The luminance signal Y has a frequency band from the DC component of about 4.2 MHz.

Usually, the frequencies of the color burst signal CBRST and the color sub carrier for generating the carrier color signal CARC are selected so as not to allow interference between the luminance signal Y and the color signal C.

The NTSC signal system employs so-called "frequency interleaving" where the frequency of this color sub carrier is set to an odd number multiple of half of the horizontal scanning frequency.

Summarizing the problems to be solved by the invention, the above conventional video encoder cannot adjust the output level of the synthesized composite video signal Sc.

For this reason, when connecting a digital-to-analog converter (DAC) or driver or other device to the latter stage, the digital-to-analog converter must receive the fixed output level of the video encoder.

However, a digital-to-analog converter cannot exhibit its full performance when converting inputs near the maximum value and the minimum value, for example, in the case of a 10-bit input digital-to-analog converter, near 0 or 1023, to an analog format. Therefore, as mentioned above, when receiving a composite video signal Sc of a fixed level, a high precision digital-to-analog converter output may not be obtained.

Also, in a driver, there are some types that are supplied with 0V to +5V as the power supply voltage when trying to obtain an output of, for example, 0 to 1V. It is difficult to configure a system giving an output of 0V with a power supply voltage of 0V, so −5V is actually generated in the driver and −5V and +5V are supplied to an amplifier.

However, the −5V generated in the driver has a very small capacity, so if possible it is better that the signal be input in a region of +5V.

In this way, realization of a video encoder capable of adjusting the output level has been demanded.

SUMMARY OF THE INVENTION

An object of the present invention is to provide a video encoder able to adjust the output level and able to more effectively make use of the performance of a device at a latter stage.

Another object of the present invention is to provide an image processing system using such a video encoder.

To attain the above objects, according to a first aspect of the present invention, there is provided a video encoder for combining a color signal and a luminance signal including a frequency component of the color signal to generate a composite video signal, having a level adjustment circuit for adjusting the output level of the generated composite video signal based on a setting value.

Preferably, the video encoder further comprises an encoding unit for performing predetermined filtering with respect to an input luminance signal and color signal and modulating the color signal; a trap circuit for removing the frequency component of the color signal included in the luminance signal output from the encoding unit and outputting the result; a selector for selecting either the luminance signal output from the encoding unit or the luminance signal output from the trap circuit in accordance with a control signal; and a combining circuit for combining the luminance signal selected by the selector and the color signal output from the encoding unit to generate the composite video signal.

More preferably, the control signal instructs the selector to select the output luminance signal of the trap circuit when the raw video has a large cross-color effect and to select the output luminance signal of the encoding unit when the cross-color effect is small.

Alternatively, the trap circuit has a band pass filter having a frequency of the carrier of the color signal as a center frequency and a subtractor for subtracting the luminance signal and the output signal of the band pass filter.

According to a second aspect of the present invention, there is provided an image processing system comprising a video encoder for combining a color signal and a luminance signal including a frequency component of the color signal to generate a composite video signal, the video encoder having a level adjustment circuit for adjusting the output level of the generated composite video signal based on a setting value; a storage circuit for storing display data and texture data required by at least one graphic element; and a logic circuit provided with at least an interpolated data generation circuit for interpolating polygon rendering data of vertexes of a unit graphic to generate interpolated data of a pixel positioned within the unit graphic and a texture processing circuit for dividing homogeneous coordinates (s, t) of texture included in the interpolated data by a homogeneous term q to generate "s/q" and "t/q", reading the texture data from the storage circuit by using a texture address corresponding to the "s/q" and "t/q", and performing processing to apply the texture data to a surface of a graphic element of the display data, the storage circuit and the logic circuit being accommodated in one semiconductor chip; and a rendering circuit receiving polygon rendering data including three-dimensional coordinates (x, y, z), R (red), G (green), and B (blue) data, homogeneous coordinates (s, t) of the texture, and the homogeneous term q for vertexes of the unit graphic, performing rendering, and outputting the result to the video encoder.

Preferably, the video encoder includes an encoding unit for performing predetermined filtering with respect to an input luminance signal and color signal and modulating the color signal, a trap circuit for removing the frequency component of the color signal included in the luminance signal output from the encoding unit and outputting the result, a selector for selecting either the luminance signal output from the encoding unit or the luminance signal output from the trap circuit in accordance with a control signal, and a combining circuit for combining the luminance signal selected by the selector and the color signal output from the encoding unit to generate the composite video signal, and the system further comprises a main processor for outputting to the selector a control signal instructing it to select the output luminance signal of the trap circuit when the raw video has a large cross-color effect and to select the output luminance signal of the encoding unit when the cross-color effect is small.

More preferably, the rendering circuit outputs video data to the video encoder as is, without having to render the same.

Alternatively, the trap circuit has a band pass filter having the frequency of the carrier of the color signal as its center frequency and a subtractor for subtracting the luminance signal and the output signal of the band pass filter.

According to the present invention, the encoding unit performs the predetermined filtering on the input luminance signal and color signal (color difference signal), modulates the luminance signal, outputs the color signal to the trap circuit and the selector, and outputs the color signal to the combining circuit.

At this time, when the cross-color effect is not so noticeable, such as in a natural image, and when deterioration of the image quality due to the trap circuit must be avoided, the selector selects the un-trapped luminance signal and supplies it to the combining circuit.

Then, the combining circuit combines the luminance signal and the color signal to generate the composite video signal. The level adjustment circuit adjusts the generated composite video signal in its output level to a level in accordance with the setting and outputs the result to the display device.

The video displayed on the display device consequently becomes a video with little deterioration since video data relating to a natural image where the cross-color effect is not noticeable in the composite video signal is not subjected to Y trap processing, which has the side effect of deteriorating resolution.

On the other hand, in the case of a three-dimensional computer image where the raw video has a large cross-color effect, the selector selects a luminance signal from which the trap circuit removed the frequency component of the color signal included in the luminance signal and outputs it to the combining circuit.

Then, the combining circuit combines the luminance signal and the color signal to generate the composite video signal. The level adjustment circuit adjusts the generated composite video signal in its output level to a level in accordance with the setting value and outputs the result to the display device.

The video displayed on the display device thus becomes a video in which the effect of cross-color is eliminated in the composite video signal.

BRIEF DESCRIPTION OF THE DRAWINGS

These and other objects and features of the present invention will become clearer from the following description of the preferred embodiments given with reference to the attached drawings, wherein:

FIG. 5 is a view of a first example of settings of tap numbers and FIR filter coefficients of a low pass filter (LPF) for the luminance signal Y;

Figure 9:
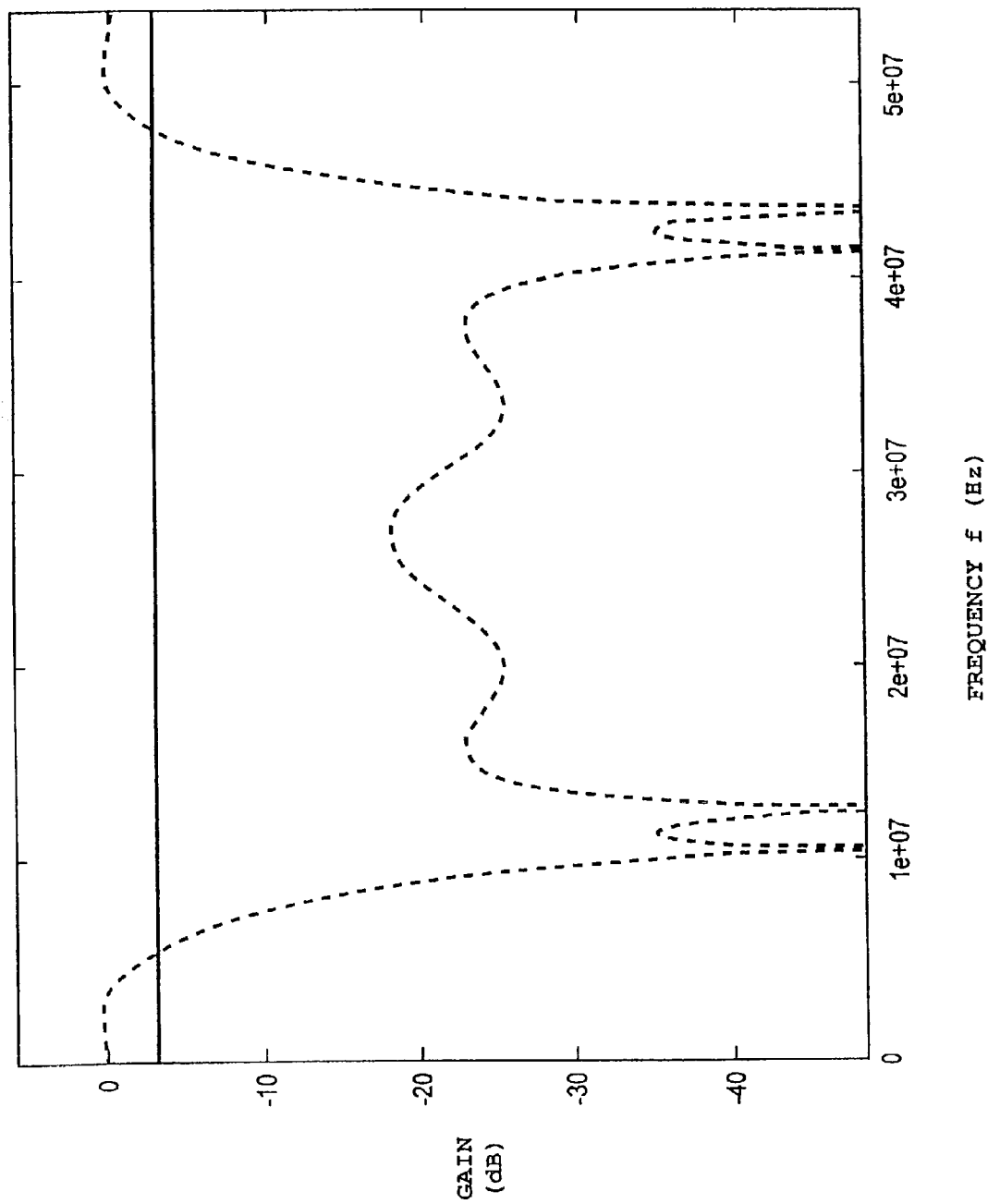
Figure 10:
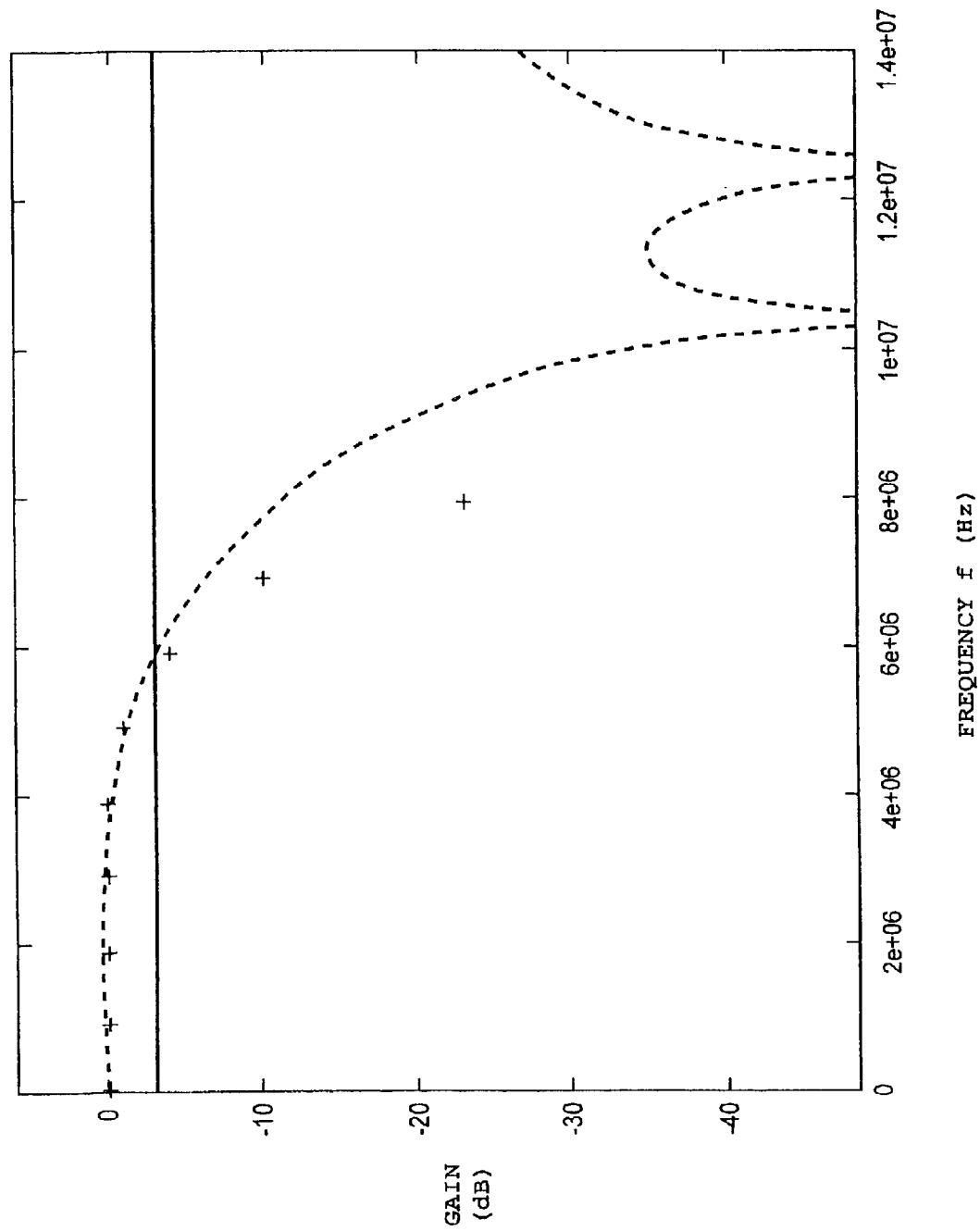
Figure 12:
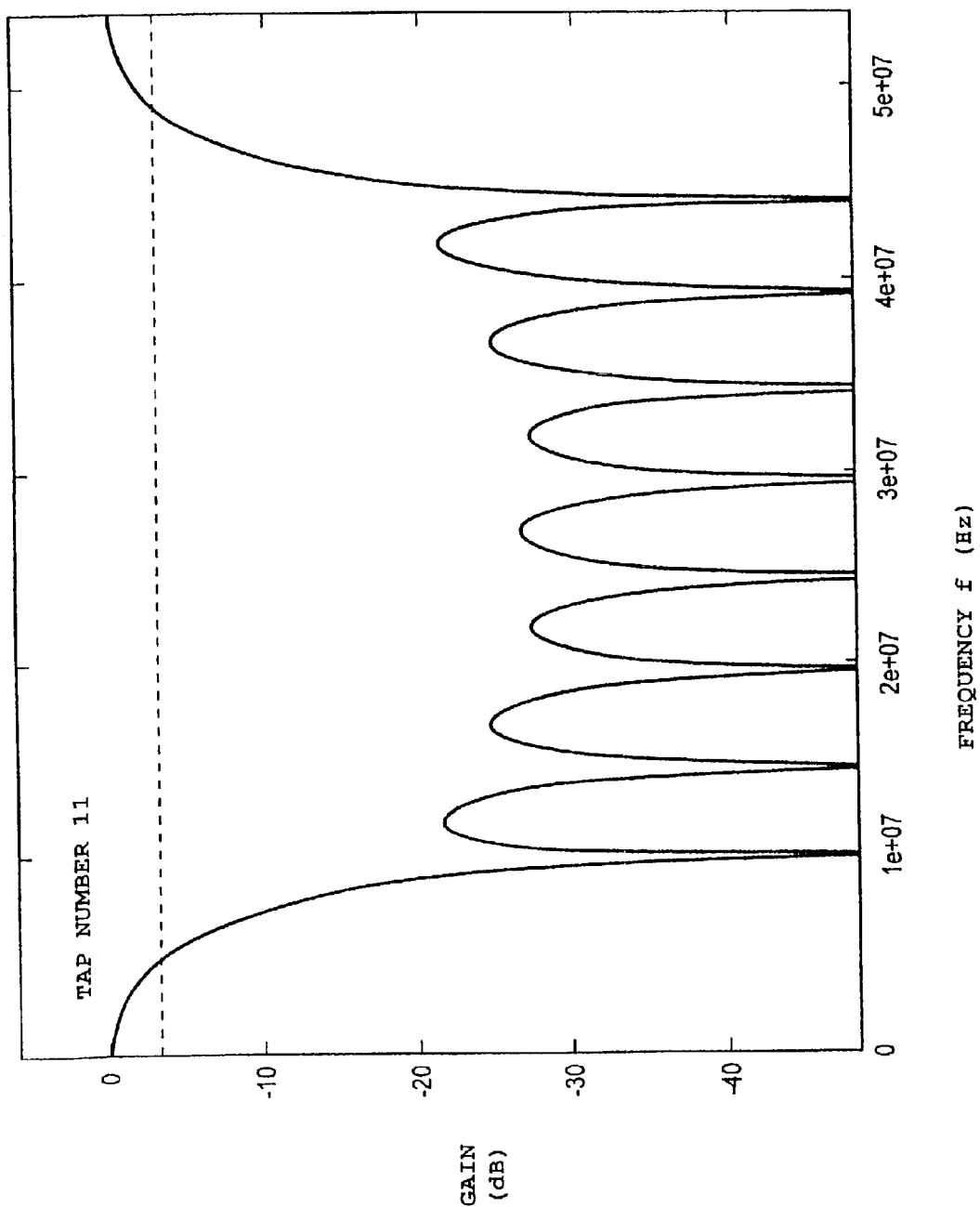
Figure 13:
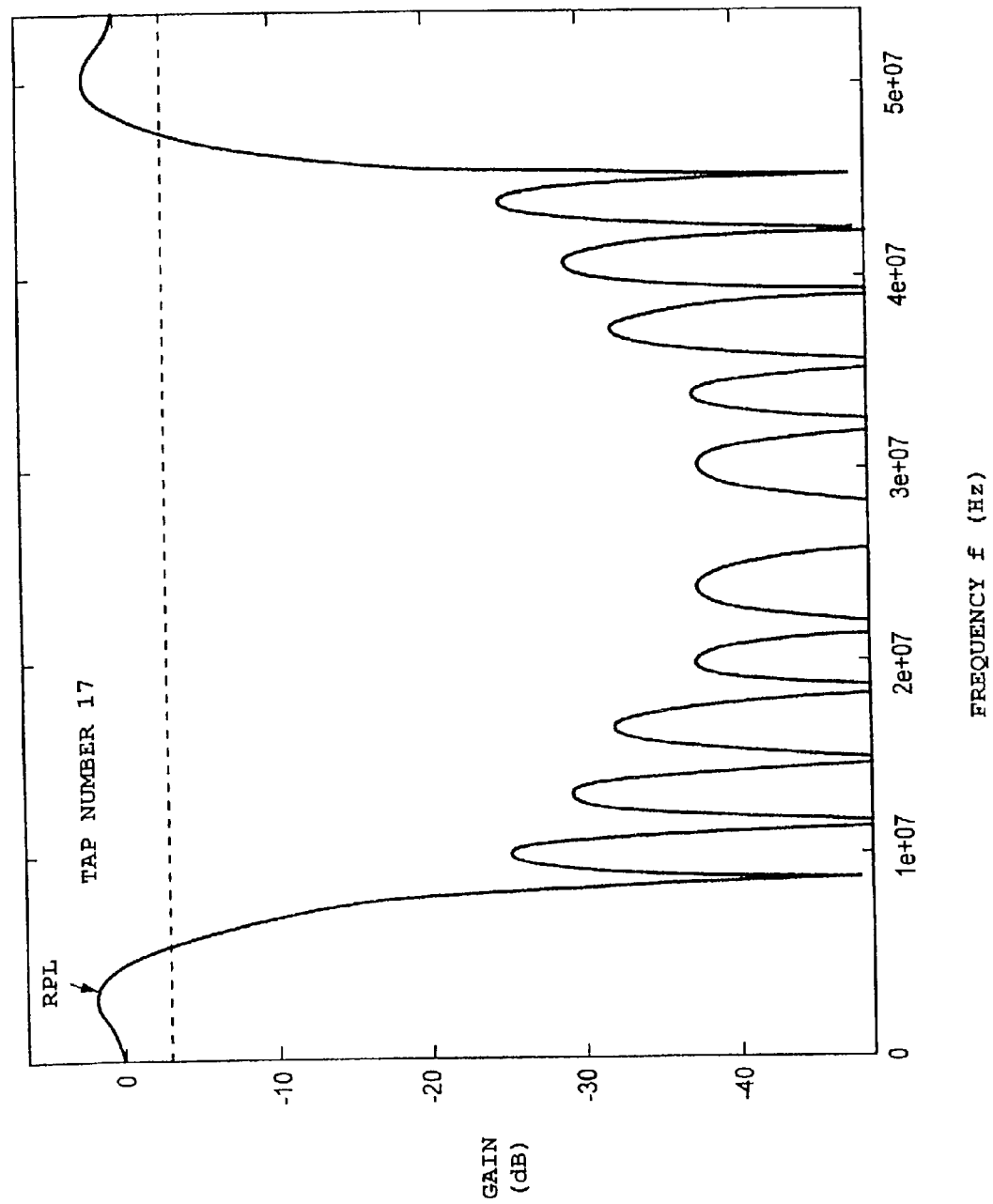
Figure 14:
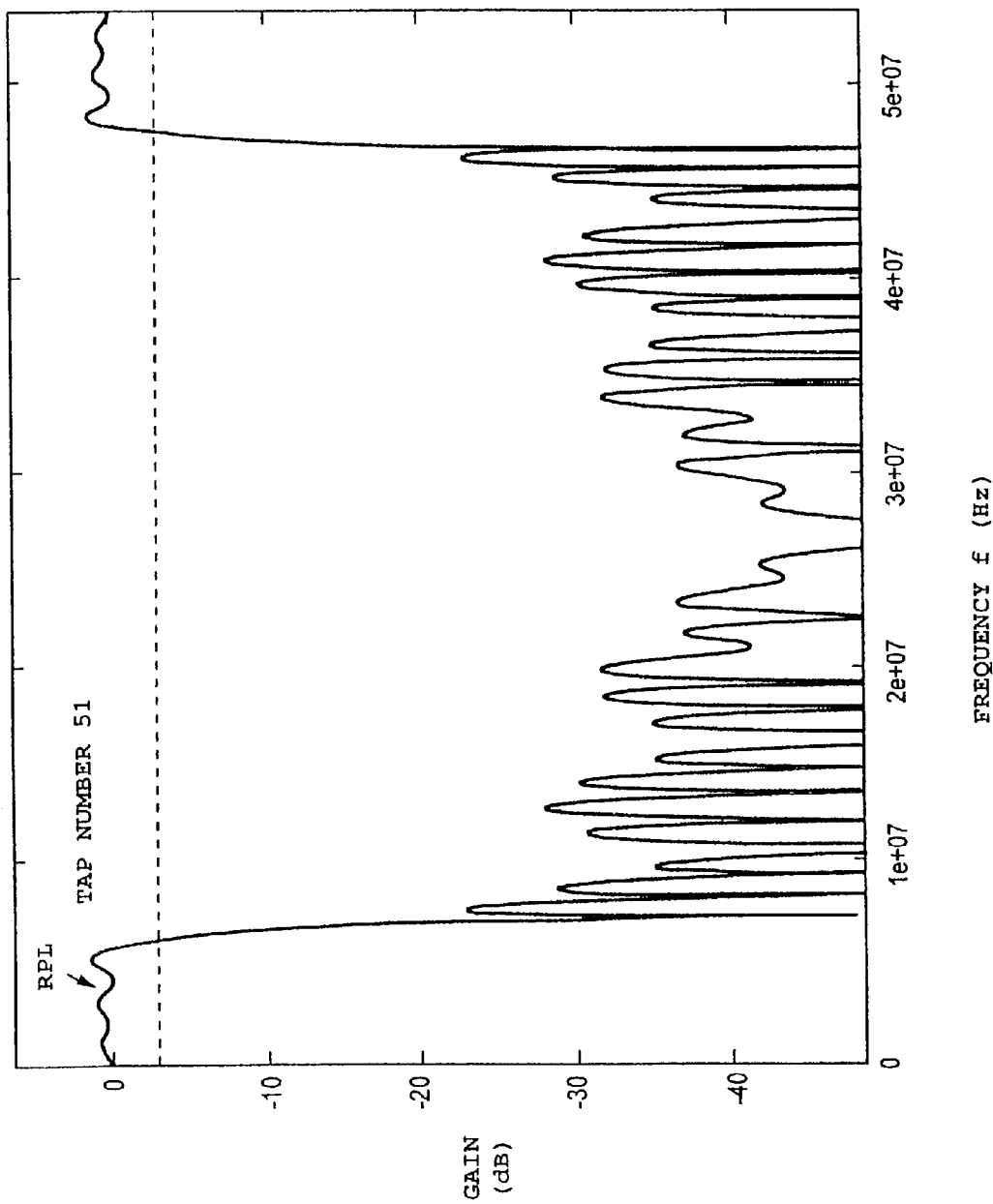
Figure 15:
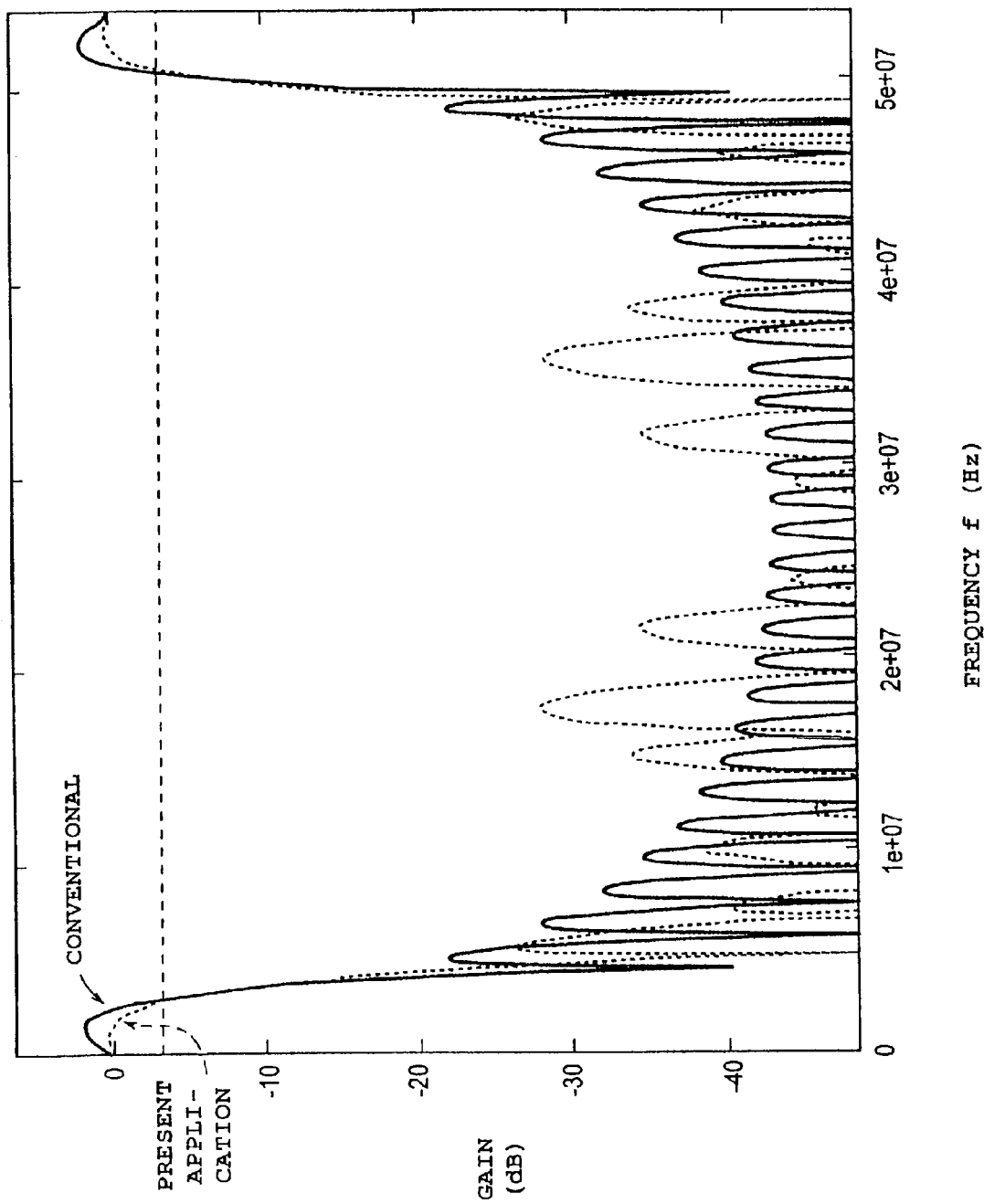
Figure 16:
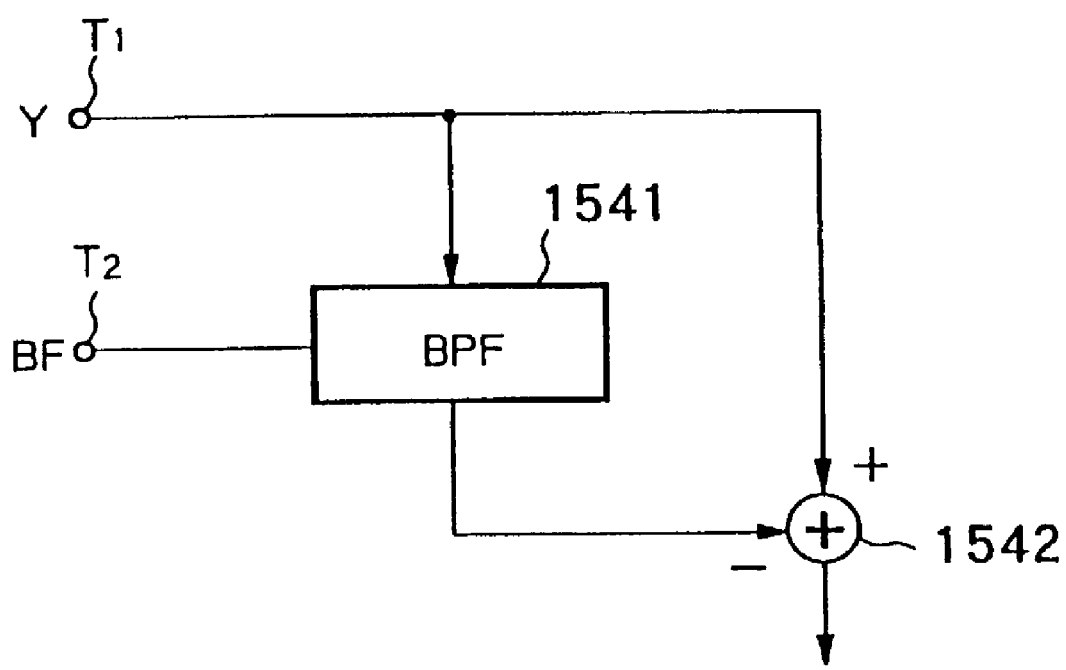
Figure 18:
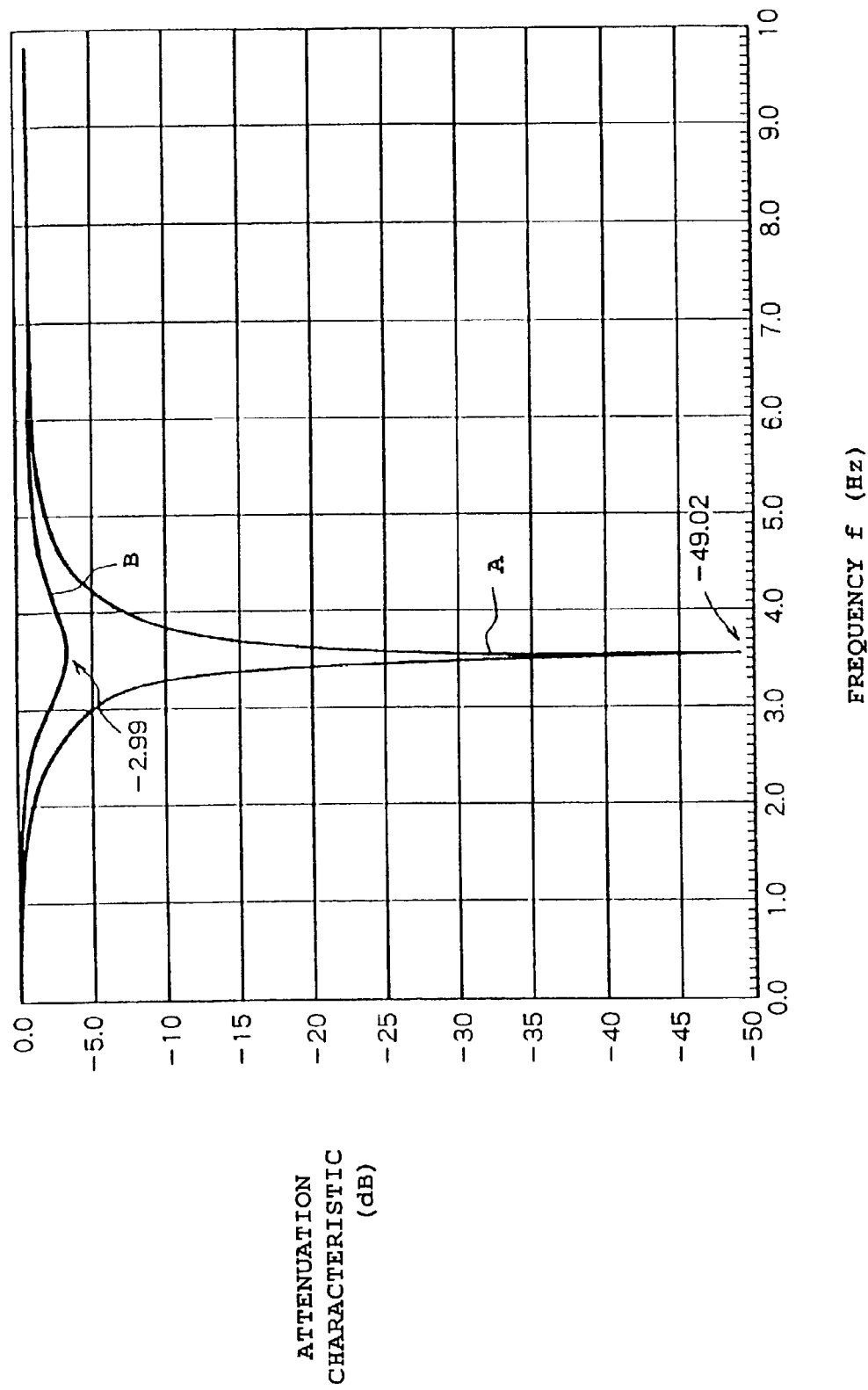
Figure 19:
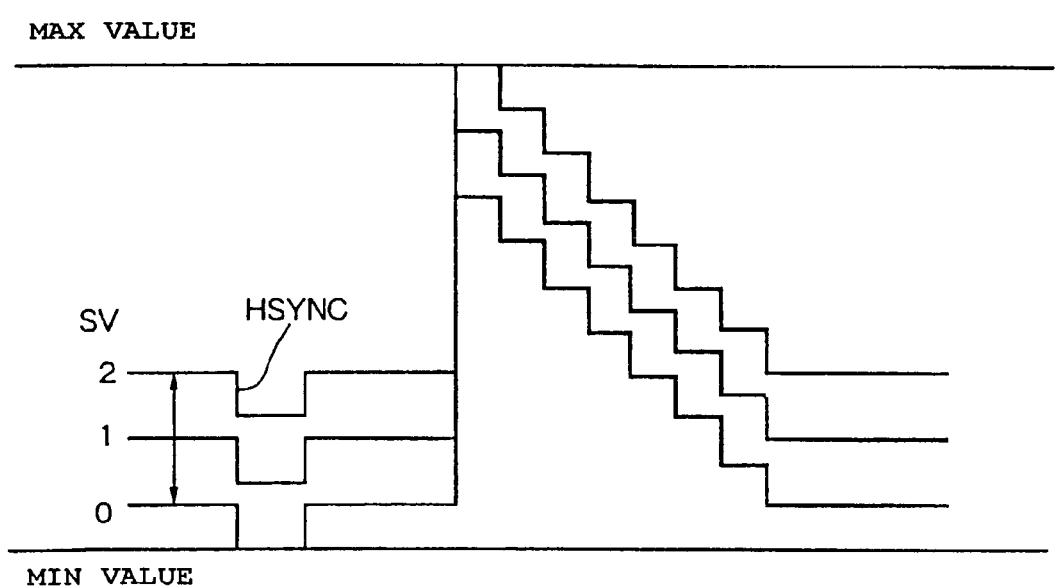
Figure 20:
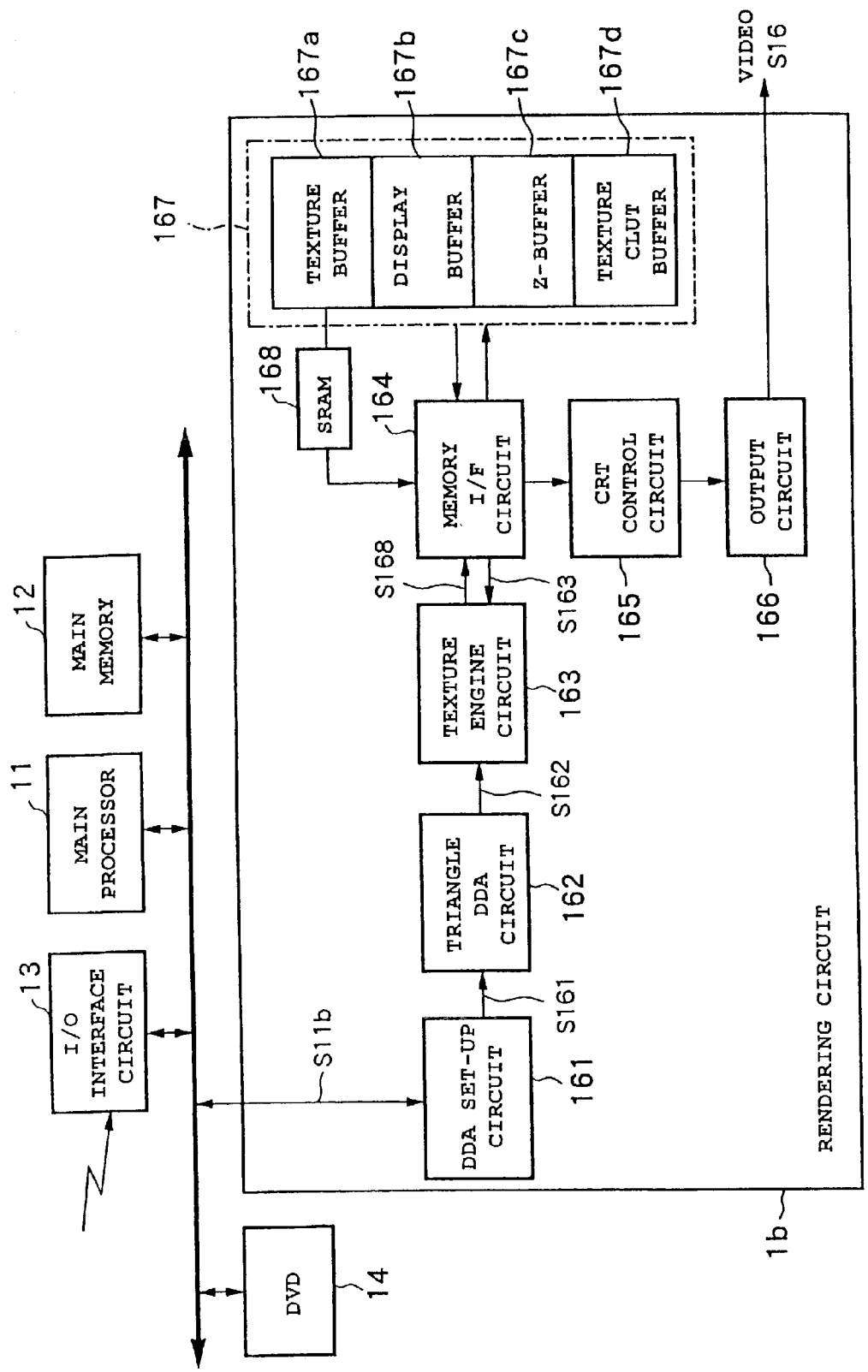
Figure 21:
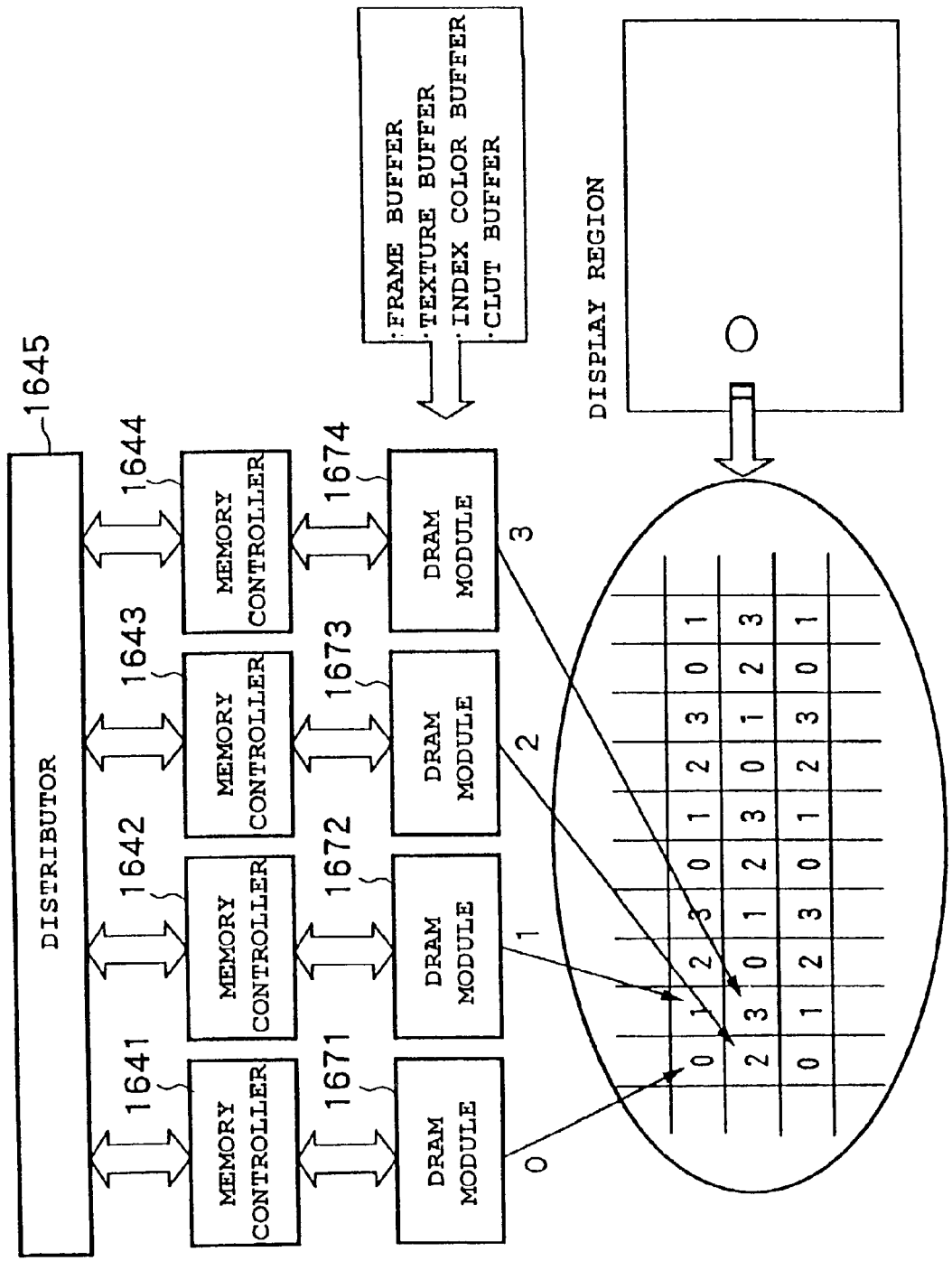
Figure 22:
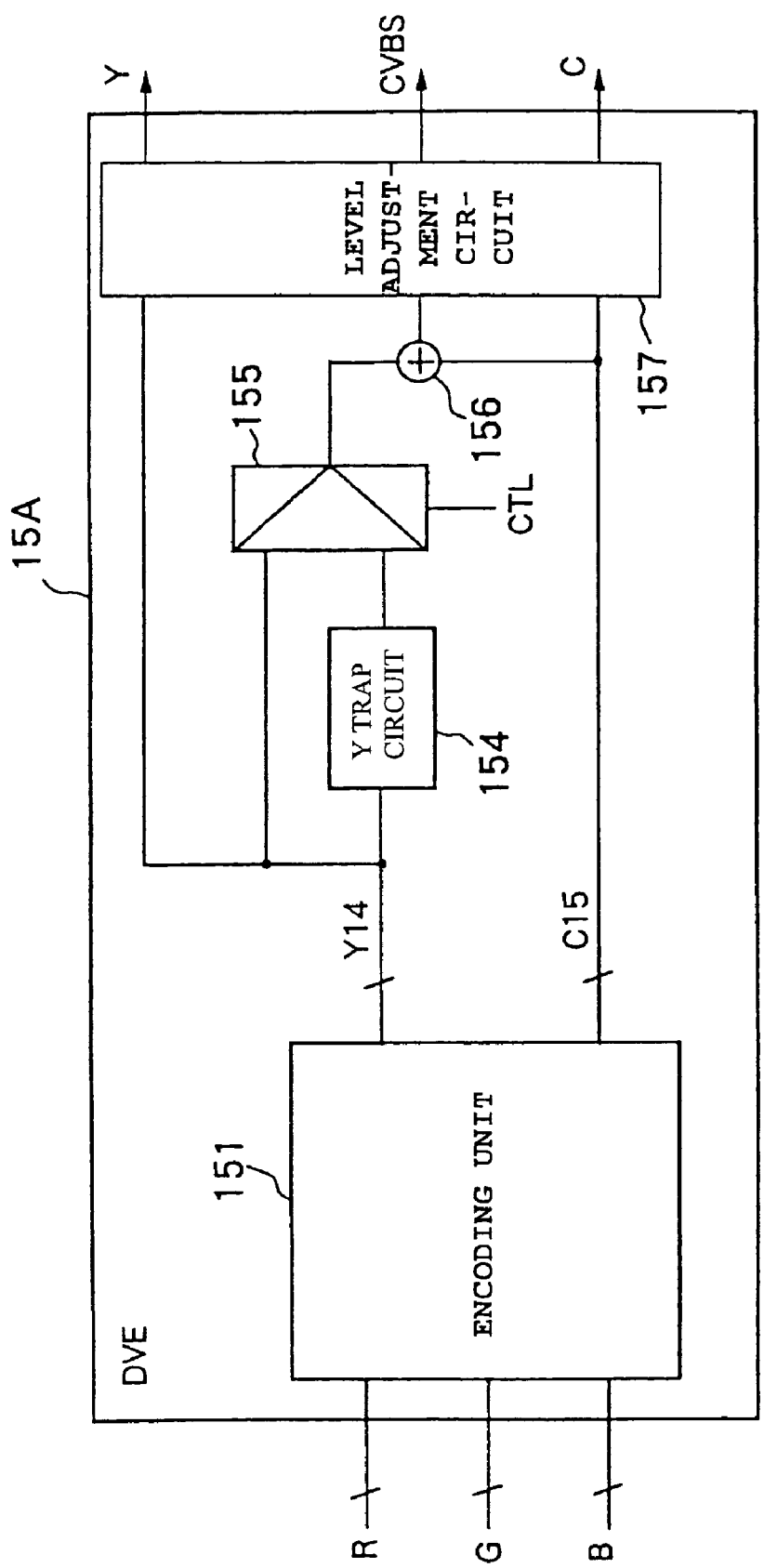
Figure 23:
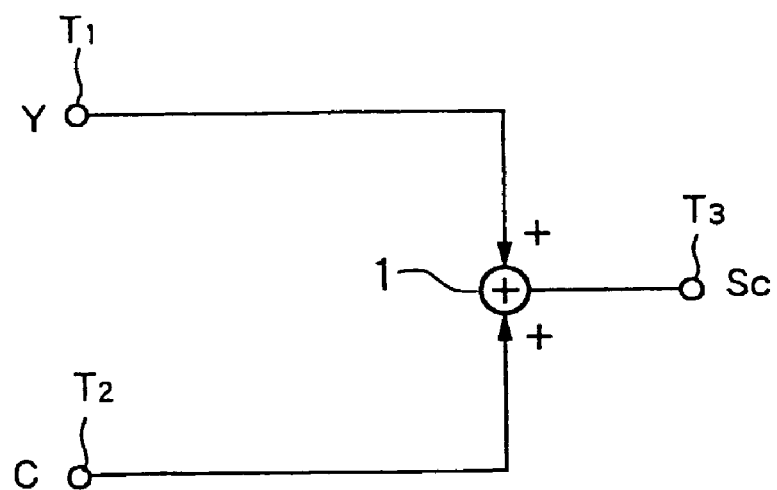
Figure 24A:
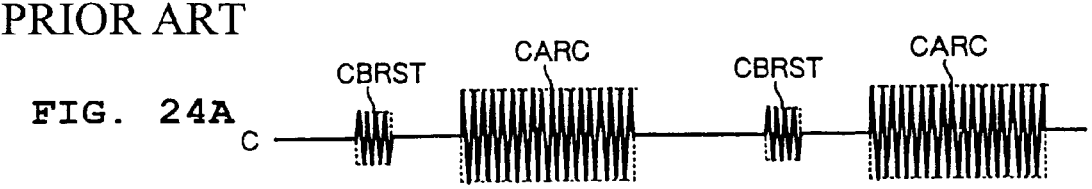
Figure 24B:
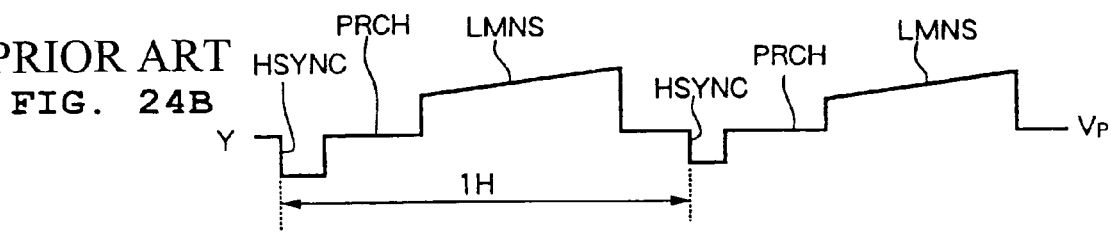
Figure 24C:

FIG; 7 is a view of the frequency characteristic of a low pass filter set with a tap number and FIR filter coefficient as shown in FIG. 5;

FIG. 8 is a view of a second example of settings of tap numbers and FIR filter coefficients of a low pass filter for the luminance signal Y;

FIG. 9 is a view of the frequency characteristic of a low pass filter set with a tap number and FIR filter coefficient as shown in FIG. 8;

FIG. 10 is a view of the frequency characteristic of a low pass filter set with a tap number and FIR filter coefficient as shown in FIG. 8;

FIG. 11 is a view of the relationship of the tap number and the frequency characteristic of an FIR filter;

FIG. 12 is a view of the frequency characteristic of an FIR filter in a case where the tap number is 11;

FIG. 13 is a view of the frequency characteristic of an FIR filter in a case where the tap number is 17;

FIG. 14 is a view of the frequency characteristic of an FIR filter in a case where the tap number is 51;

FIG. 15 is a view of the frequency characteristics of an FIR filter having a two-stage configuration according to the present invention having a cut-off frequency of 3 MHz and a conventional FIR filter having a single-stage configuration and a tap number of 31;

FIG. 16 is a circuit diagram of an example of the configuration of a Y trap circuit according to the present embodiment;

FIGS. 17A to 17E are waveform diagrams of the operation of a Y trap circuit according to the present embodiment;

FIG. 18 is a view of characteristics of the Y trap circuit according to the present embodiment;

FIG. 19 is a view of an example of the relationship between a setting value SV and an adjustment level in the level adjustment circuit according to the present embodiment;

FIG. 20 is a block diagram of an example of the configuration of a rendering circuit according to the present embodiment;

FIG. 21 is a view for explaining a data storage method in the rendering circuit according to the present embodiment;

FIG. 22 is a block diagram of another example of the configuration of the digital video encoder according to the present embodiment;

FIG. 23 is a circuit diagram of principal parts of a conventional video encoder; and FIG. 24, consisting of FIGS. 24A through 24C, is a waveform diagram of principal parts of a conventional video encoder.

DESCRIPTION OF THE PREFERRED EMBODIMENTS

Preferred embodiments of the present invention will be described in detail below while referring to the attached figures.

In the embodiments below, explanation will be given of an image processing system used for a personal computer etc. and including a three-dimensional computer graphics system for displaying a desired three-dimensional image with respect to any three-dimensional object model or natural image stored in a storage device on a cathode ray tube (CRT) or other display at a high speed.

Figure 1:
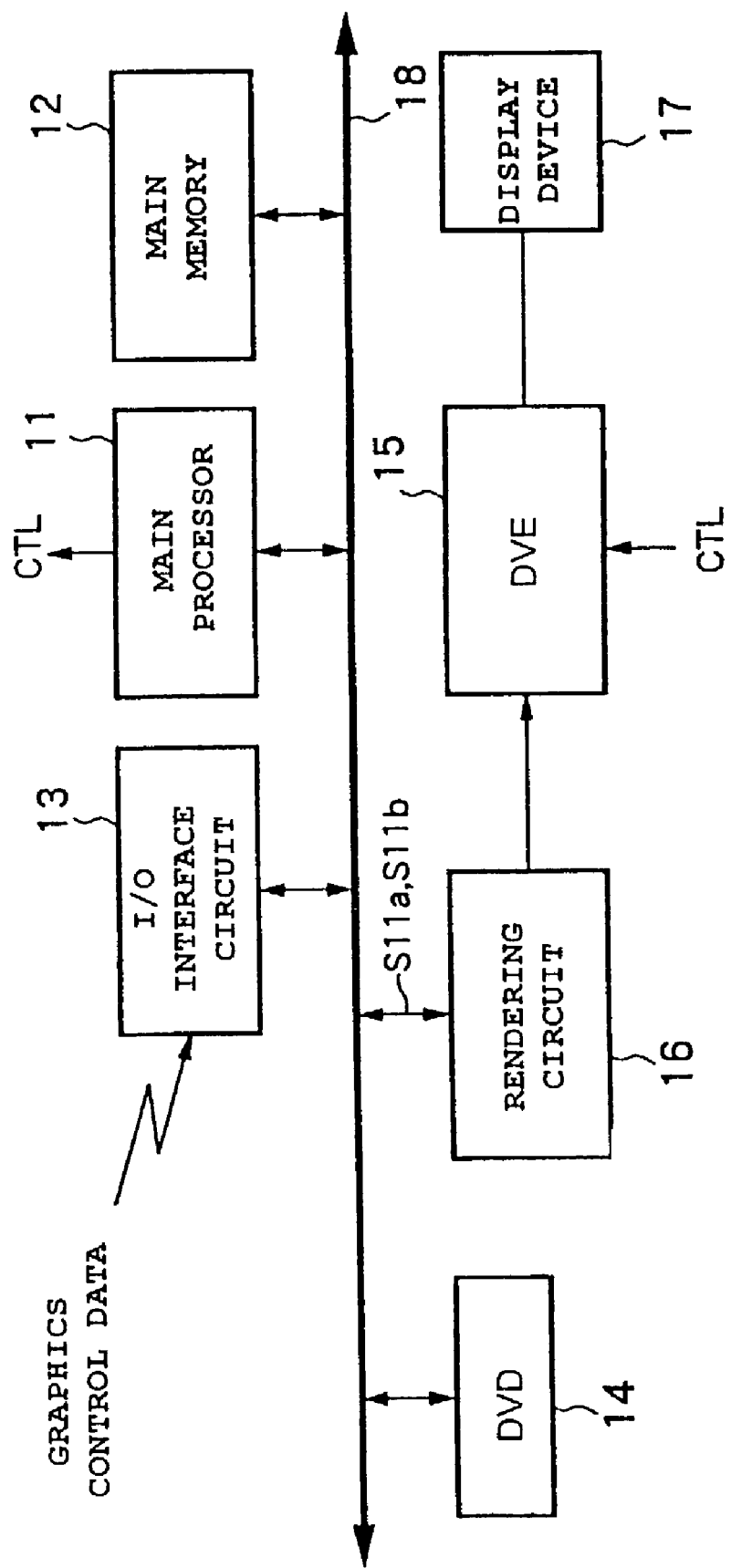
FIG. 1 is a view of an embodiment of a system configuration of an image processing system including a three-dimensional computer graphics system according to the present invention.

FIG. 1 is a view of an embodiment of the system configuration of an image processing system including a three-dimensional computer graphics system according to the present invention.

The image processing system 10 has, as shown in FIG. 1, a main processor 11, main memory 12, I/O interface circuit 13, digital versatile disk (DVD) device 14, digital video encoder (DVE) 15, rendering circuit 16, and CRT or other display device 17.

In the image processing system 10, among these constituent elements, the main processor 11, main memory 12, I/O interface circuit 13, digital versatile disk device 14, and rendering circuit 16 are connected via a main bus 18.

The image processing system 10 basically displays on the display device 17 a natural image recorded from the digital versatile disk device 15 via the digital video encoder 15 and three-dimensional computer graphics processed by the rendering circuit 16.

The three-dimensional computer graphics system is a system for performing polygon rendering so as to express a three-dimensional model as a combination of triangles (polygons) serving as unit graphics, draw these polygons, decide on the color of each pixel of the display screen, and display the result on a display.

The three-dimensional computer graphics system expresses a three-dimensional object using not only the (x, y) coordinates expressing the position on a plane, but also a z-coordinate expressing the depth. It specifies any point in the three-dimensional space by these three coordinates (x, y, z).

In the present embodiment, the three-dimensional computer graphics system is comprised, as shown in FIG. 1, of a main processor 11, main memory 12, I/O interface circuit 13, and rendering circuit 16 connected via a main bus 18.

Below, an explanation will be given of the functions of the constituent elements of FIG. 1.

The main processor 11 supplies, for example, video data S11a concerning a natural image read from the digital versatile disk device 15 via the main bus 18 to the digital video encoder 15 through the rendering circuit 16.

Also, the main processor 11 reads the necessary graphics data from the main memory 12 in accordance with, for example, the state of progress of the application and performs clipping, lighting, geometric processing, etc. on the graphics data to generate polygon rendering data. The main processor 11 outputs the polygon rendering data S11b to the rendering circuit 16 via the main bus 18.

Further, the main processor 11 supplies the digital video encoder 15 with the control signal CTL through a control line (not illustrated) to instruct it to bypass processing by the Y trap circuit when processing a natural image in order that the cross-color effect will not be so noticeable and so that deterioration of the image quality due to the Y trap may be avoided. Conversely, the main processor 11 instructs the digital video encoder 15 to carry out processing by the Y trap circuit when processing three-dimensional computer graphics (CG) rendered by the rendering circuit 16 in order that the effect of cross-color is large.

The I/O interface circuit 13 receives as input motion control information or polygon rendering data from the outside as needed and outputs the same to the rendering circuit 16 via the main bus 18.

The polygon rendering data includes data (x, y, z, R, G, B, s, t, q) of each of the three vertexes of the polygon.

Here, the (x, y, z) data indicates the three-dimensional coordinates of a vertex of the polygon, and (R, G, B) data indicates the luminance values of red, green, and blue at the three-dimensional coordinates, respectively.

In the (s, t, q) data, (s, t) indicate homogeneous coordinates of a corresponding texture and q indicates a homogeneous term. Here, the texture sizes USIZE and VSIZE are respectively multiplied with the "s/q" and "t/q" to obtain the texture coordinate data (u, v). The texture data stored in the texture buffer is accessed by using the texture coordinate data (u, v).

Namely, polygon rendering data comprises physical coordinate values of the vertexes of a triangle and colors and texture data of each of the vertexes.

The digital video encoder 15 extracts predetermined frequency components of the luminance signal Y and the color signal C (color difference signals Cb, Cr) related to the R, G, and B signals concerning a natural image or three-dimensional computer graphics supplied from the rendering circuit 16, then applies predetermined modulation to the color difference signal Cb and color difference signal Cr, selects the luminance signal Y subjected to the Y trap processing at the Y trap circuit when the control signal CTL of the main processor 11 instructs Y trap processing for the luminance signal Y, selects the luminance signal Y not subjected to the Y trap processing where the control signal CTL instructs to bypass the Y trap processing, adjusts the output levels of a composite video signal CVBS obtained by combining the selected luminance signal Y and the color signal obtained by applying predetermined modulation to the color difference signal Cb and the color difference signal Cr, the selected luminance signal Y, and the color signal C to levels in accordance with setting values, and outputs the results to the display device 17.

Figure 2:
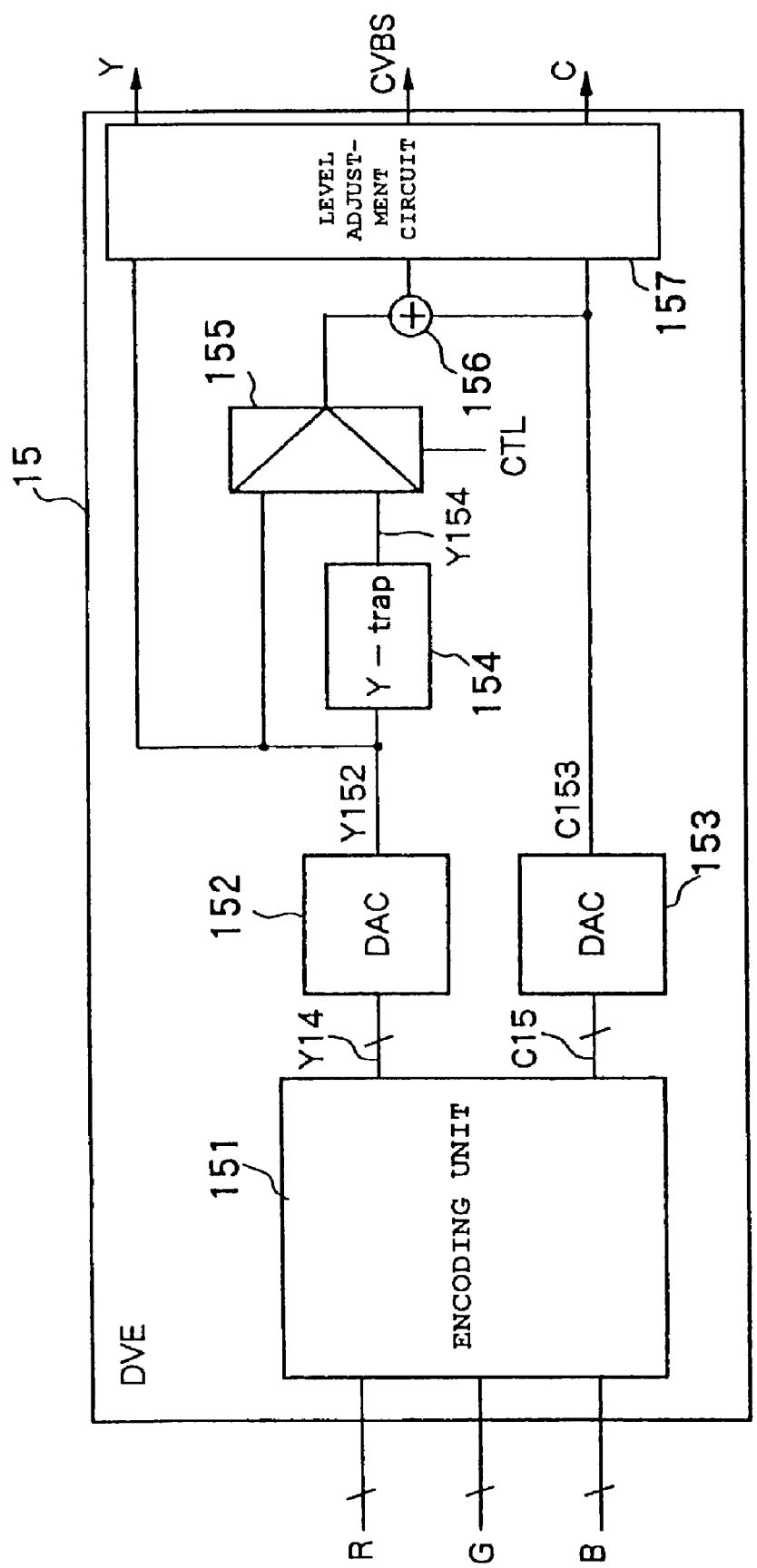
FIG. 2 is a block diagram of an example of the configuration of a digital video encoder (DVE) according to the present embodiment.

FIG. 2 is a block diagram of an example of the configuration of the digital video encoder 15 according to the present embodiment.

The digital video encoder 15 has, as shown in FIG. 2, an encoding unit 151, digital-to-analog converters (DACs) 152 and 153, a Y trap circuit 154, selector 155, combining circuit 156, and level adjustment circuit 157.

The encoding unit 151 extracts predetermined frequency components of the luminance signal Y and the color signal C (color difference signals Cb, Cr) related to R, G, and B signals concerning a natural image or three-dimensional computer graphics supplied from the rendering circuit 16, and then applies predetermined modulation to the color difference signal Cb and the color difference signal Cr.

Figure 3:
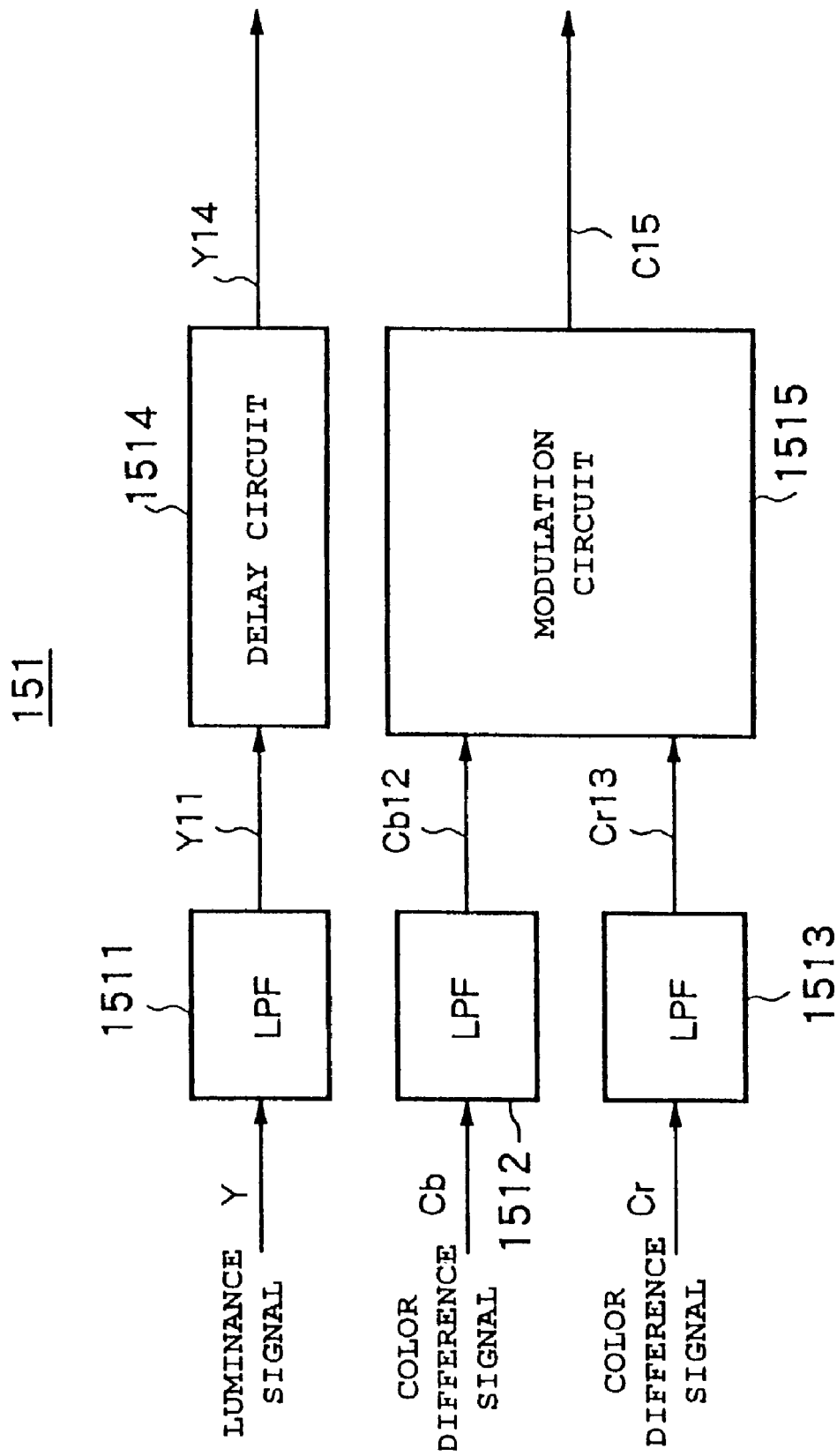
FIG. 3 is a block diagram of an example of the configuration of an encoding unit in the digital video encoder according to the present embodiment.

FIG. 3 is a block diagram of an example of the configuration of an encoding unit in a digital video encoder (DVE) according to the present embodiment.

The encoding unit 151 has, as shown in FIG. 3, a low pass filter (LPF) 1511 comprised of an FIR filter for the luminance signal Y, a low pass filter (LPF) 1512 comprised of an FIR filter for the color difference signal Cb, a low pass filter (LPF) 1513 comprised by an FIR filter for the color difference signal Cr, delay circuit 1514, and modulation circuit 1515.

Figure 4:
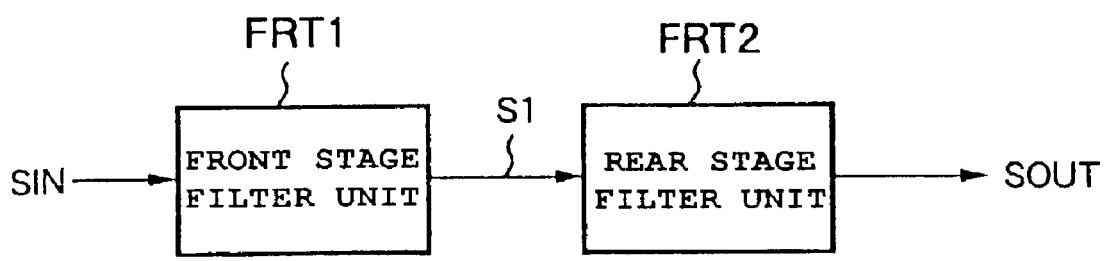
FIG. 4 is a block diagram of an embodiment of a finite impulse response (FIR) filter according to the present invention.

The low pass filter 1511 has the configuration as shown in FIG. 4, that is, a two-stage configuration comprised by cascade connecting a front stage filter unit FRT1 having a tap number set to a value within a range where no pass band ripple occurs and having a gentle sharpness near the cut-off frequency and having filter coefficients h (n) and a sum of the same set to values of a power of 2. The low pass filter 1511 additionally has a rear stage filter unit FRT2 having a tap number set to a value able to lift up the gentle portion in the pass band of the signal S1 with respect to the signal S1 from the front stage filter unit FRT1 and able to correct the characteristic near the cut-off frequency fc so that it becomes sharp and having filter coefficients h (n) and a sum of the same set to values of a power of 2. The low pass filter 1511 extracts the low frequency component of the luminance signal Y and outputs a luminance signal Y11 having a flat pass band with no ripple and having a sharp characteristic near the cut-off frequency fc and outputs the same to the delay circuit 1514.

The low pass filter 1512 has the configuration as shown in FIG. 4, that is, a two-stage configuration comprised by cascade connecting a front stage filter unit FRT1 having a tap number set to a value within a range where no pass band ripple occurs and having a gentle sharpness near the cut-off frequency and having filter coefficients h (n) and a sum of the same set to values of a power of 2 and a rear stage filter unit FRT2 having a tap number set to a value able to lift up the gentle portion in the pass band of the signal S1 with respect to the signal S1 from the front stage filter unit FRT1 and able to correct the characteristic near the cut-off frequency fc so that it becomes sharp and having filter coefficients h (n) and a sum of the same set to values of a power of 2. The low pass filter 1512 extracts the low frequency component of the color difference signal Cb and outputs a color difference signal Cb12 having a flat pass band with no ripple and having a sharp characteristic near the cut-off frequency fc and outputs the same to the modulation circuit 1515.

The low pass filter 1513 has the configuration as shown in FIG. 4, that is, a two-stage configuration comprised by cascade connecting a front stage filter unit FRT1 having a tap number set to a value within a range where no pass band ripple occurs and having a gentle sharpness near the cut-off frequency and having filter coefficients h (n) and a sum of the same set to values of a power of 2 and a rear stage filter unit FRT2 having a tap number set to a value able to lift up the gentle portion in the pass band of the signal S1 with respect to the signal S1 from the front stage filter unit FRT1 and able to correct the characteristic near the cut-off frequency fc so that it becomes sharp and having filter coefficients h (n) and a sum of the same set to values of a power of 2. The low pass filter 1513 extracts the low frequency component of the color difference signal Cr and outputs a color difference signal Cr13 having a flat pass band with no ripple and having a sharp characteristic near the cut-off frequency fc and outputs the same to the modulation circuit 1515.

The delay circuit 1514 delays the luminance signal Y11 from the low pass filter 1511 by a predetermined time, for example, exactly the time required for the modulation of the modulation circuit 1515, to output a luminance signal Y14.

The modulation circuit 1515 receives the color difference signal Cb12 from the low pass filter 1512 and the color difference signal Cr13 from the low pass filter 1513, applies predetermined modulation to obtain a color signal, and outputs this as the color signal C15.

Here, an explanation will be given of an example of the settings of the tap numbers and the FIR filter coefficients of the low pass filter and the frequency characteristic by taking as an example a low pass filter (FIR filter) for the luminance signal Y in the encoding unit 151.

FIG. 5 is a view of a first example of settings of the tap numbers and the FIR filter coefficients of the low pass filter (LPF) for the luminance signal Y.

In FIG. 5, two examples are shown where the cut-off frequency fc is 6 MHz (mode 0; MD0) and where it is 3 MHz (mode 1; MD1).

In the example of the mode 0 shown in FIG. 5, the front stage filter unit FRT1 has a tap number set to a value of 13 within a range where no pass band ripple occurs and having a gentle sharpness near the cut-off frequency, has FIR filter coefficients h (n) and a sum of the same set to values of a power of 2 (0, 0, 0, 1, 2, 4, 2, 4, 2, 1, 0, 0, 0×1/16), passes a low frequency component of the input digital signal SIN up to the frequency fp therethrough, and outputs the result as the signal S1 to the rear stage filter unit FRT2.

The rear stage filter unit FRT2 has a tap number set to a value of 23 able to lift up the gentle portion (for example, ripple number 1) in the pass band of the signal S1 with respect to the signal S1 from the front stage filter unit FRT1 having a frequency characteristic where no pass band ripple occurs and the sharpness near the cut-off frequency is gentle and enables correction so that the characteristic near the cut-off frequency fc becomes sharp, has FIR filter coefficients h (n) and a sum of the same set to values of a power of 2 (0, 0, 0, 0, 0, 0, 0, −1, −1, 1, 4, 2, 4, 1, −1, −1, 0, 0, 0, 0, 0, 0, 0×1/8), and generates and outputs a signal SOUT having corrected frequency characteristics of the output signal S1 of the front stage filter unit FRT1, that is, having a characteristic of a flat pass band with no ripple and a sharp characteristic near the cutoff frequency fc.

In the example of the mode 1 shown in FIG. 5, the front stage filter unit FRT1 has a tap number set to a value of 13 within a range where no pass band ripple occurs and having a gentle sharpness near the cut-off frequency, has FIR filter coefficients h (n) and a sum of the same set to values of a power of 2 (0, 1, 1, 1, 2, 2, 2, 2, 2, 1, 1, 1, 0×1/16), passes a low frequency component of the input digital signal SIN up to the frequency fp therethrough, and outputs the result as the signal S1 to the rear stage filter unit FRT2.

The rear stage filter unit FRT2 has a tap number set to a value of 23 able to lift up the gentle portion (for example, ripple number 1) in the pass band of the signal S1 with respect to the signal S1 from the front stage filter unit FRT1 having a frequency characteristic where no pass band ripple occurs and the sharpness near the cut-off frequency is gentle and enables correction so that the characteristic near the cut-off frequency fc becomes sharp, has FIR filter coefficients h (n) and a sum of the same set to values of a power of 2 (0, 0, −2, −1, 0, 0, 2, 2, 2, 2, 2, 2, 2, 2, 2, 2, 0, 0, −1, −2, 0, 0×1/16), and generates and outputs a signal SOUT having corrected frequency characteristics of the output signal S1 of the front stage filter unit FRT1 that is, having a characteristic of a flat pass band with no ripple and a sharp characteristic near the cutoff frequency fc.

Figure 6:
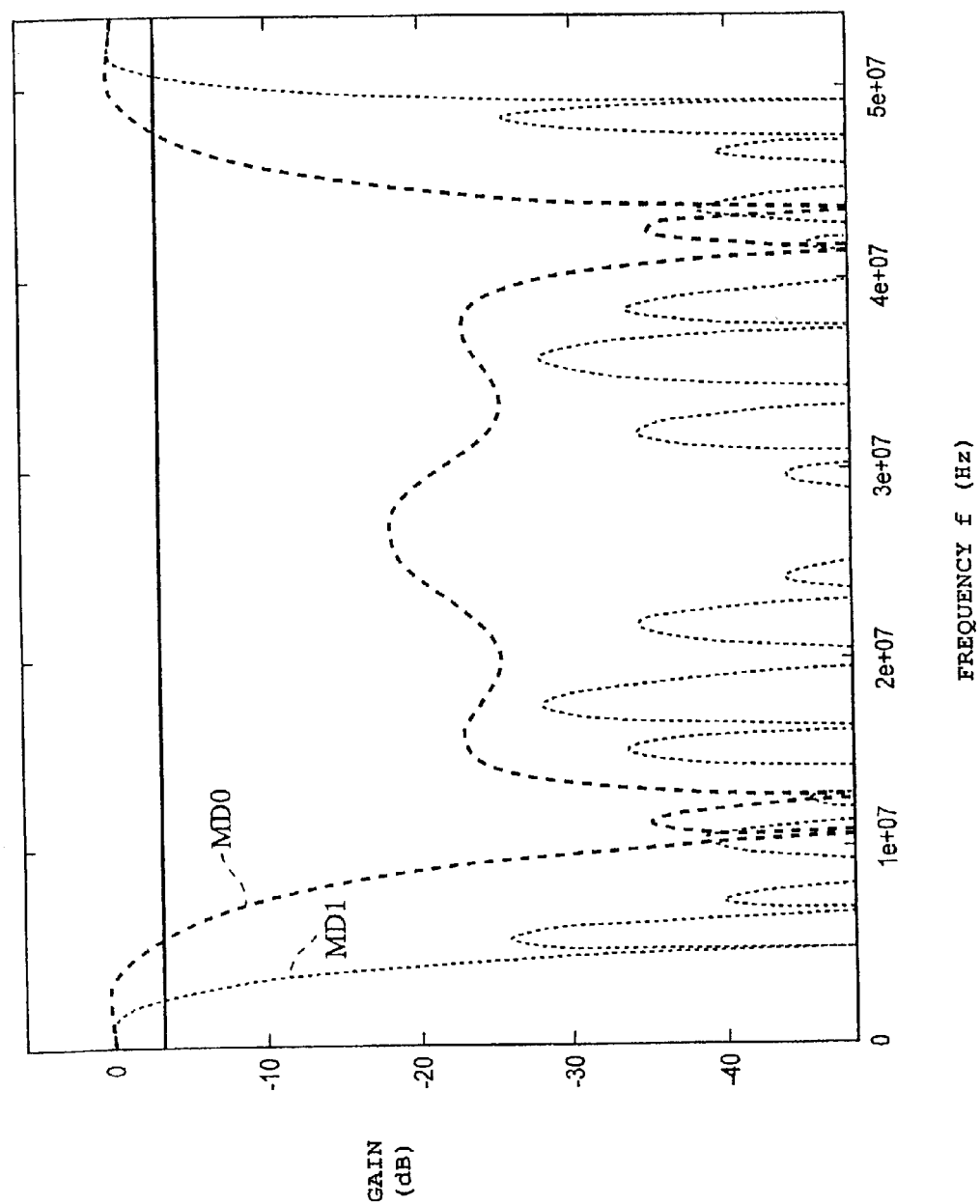
FIG. 6 is a view of the frequency characteristic of a low pass filter set with a tap number and FIR filter coefficient as shown in FIG. 5.
Figure 7:
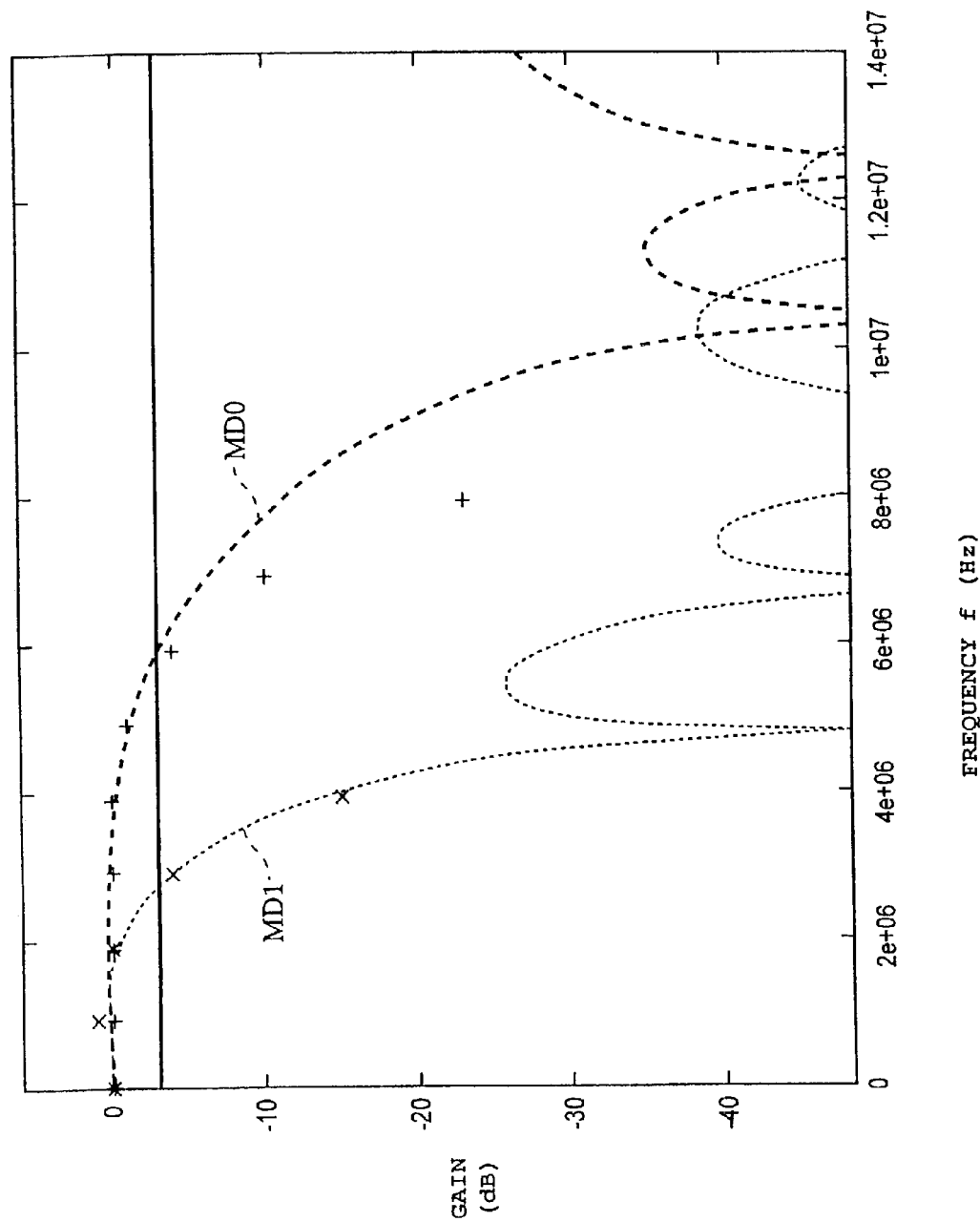

FIG. 6 and FIG. 7 are views of the frequency characteristics of a low pass filter (LPF) set with the tap numbers and the FIR filter coefficients as shown in FIG. 5.

As shown in FIG. 6 and FIG. 7, a low pass filter set with the tap numbers and the FIR filter coefficients as shown in FIG. 5 can give a signal SOUT having a characteristic of a flat pass band with no ripple and having a sharp characteristic near the cut-off frequency fc.

FIG. 8 is a view of a second example of settings of the tap numbers and FIR filter coefficients of the low pass filter (LPF) for the luminance signal Y.

FIG. 8 shows an example of the settings when the cut-off frequency fc is 6 MHz.

In the example shown in FIG. 8, the front stage filter unit FRT1 has a tap number set to a value of 13 within the range where no pass band ripple occurs and having a gentle characteristic up to the stop band STB, has FIR filter coefficients h (n) and the sum of the same set to values of a power of 2 (0, 0, 0, 2, 4, 8, 4, 8, 4, 2, 0, 0, 0×1/32), passes the low frequency component of the input digital signal SIN up to the frequency fp, and outputs the result as the signal S1 to the rear stage filter unit FRT2.

The rear stage filter unit FRT2 has a tap number set to a value of 23 able to lift up the gentle portion (for example, ripple number 1) in the pass band of the signal S1 with respect to the signal S1 from the front stage filter unit FRT1 having a frequency characteristic where no pass band ripple occurs and the sharpness near the cut-off frequency is gentle and enables correction so that the characteristic near the cut-off frequency fc becomes sharp, has FIR filter coefficients h (n) and a sum of the same set to values of a power of 2 (0, 0, 0, 0, 0, 0, 0, −1, −1, 1, 4, 2, 4, 1, −1, −1, 0, 0, 0, 0, 0, 0, 0×1/8), and generates and outputs a signal SOUT having corrected frequency characteristics of the output signal S1 of the front stage filter unit FRT1, that is, having a characteristic of a flat pass band with no ripple and a sharp characteristic near the cutoff frequency fc.

FIG. 9 and FIG. 10 are views of the frequency characteristics of a low pass filter (LPF) set with the tap numbers and the FIR filter coefficients as shown in FIG. 8.

As shown in FIG. 9 and FIG. 10, a low pass filter set with the tap numbers and the FIR filter coefficients as shown in FIG. 8 can give a signal SOUT having a characteristic of a flat pass band with no ripple and having a sharp characteristic near the cut-off frequency fc.

Next, the reason for the selection of the tap numbers and the two-stage configuration will be explained with reference to the drawings.

FIG. 11 is a view of the relationship of the tap number and the frequency characteristic of an FIR filter.

An FIR filter has, as shown in FIG. 11, the characteristics of a small attenuation, a gentle sharpness near the cut-off frequency, a large amplitude of the pass band ripple RPL, and a small number of waves of the pass band ripple RPL (finally becomes 0) when the tap number is small.

Conversely, an FIR filter has the characteristics of a large attenuation, a sharp sharpness near the cut-off frequency, a small amplitude of the pass band ripple RPL, and a large number of waves of the pass band ripple RPL when the tap number is large.

FIG. 12 to FIG. 14 show the frequency characteristics of FIR filters having tap numbers 11, 17, and 51.

In FIG. 12 to FIG. 14, the abscissas represent the frequency f, and the ordinates represent the gain.

In this case, the coefficients h (n) are rounded off so that the frequency fp becomes equal to 6.5 MHz and the total of the filter coefficients h (n) becomes 128.

As shown in FIG. 12 to FIG. 14, there is no pass band ripple RPL in the case of the tap number 11, there is one pass band ripple RPL in the case of the tap number 17, and there are many pass band ripples RPL in the case of the tap number 51.

Accordingly, as seen from FIG. 12 to FIG. 14, in order to eliminate pass band ripple RPL, the tap number cannot be set to more than a certain number. In this example, it can only be set up to 11 taps.

However, with that tap number (11 in this example), as shown in FIG. 12, there is insufficient sharpness near the cut-off frequency fc.

Therefore, in the present embodiment, the filter is given the two-stage configuration.

Namely, in the present embodiment, it becomes possible to configure an FIR filter so as to be able to obtain a signal SOUT having a flat pass band characteristic with no ripple and having a sharp characteristic near the cut-off frequency fc by setting the tap number of the front stage filter unit FRT1 to, for example 11, to obtain a frequency characteristic having no pass band ripple, but having insufficient sharpness near the cut-off frequency fc, then setting the tap number of the rear stage filter unit FRT2 to 17 or more, 19 in the present embodiment, to obtain a frequency characteristic having just one pass band ripple and having sufficient sharpness near the cut-off frequency fc by combining the frequency characteristics of the two filter units.

As described above, in the present embodiment, the FIR filter is configured so that the FIR filter coefficients h (n) of the front stage filter unit FRT1 and the rear stage filter unit FRT2 and the sum of them become powers of 2, therefore each of the front stage filter unit FRT1 and the rear stage filter unit FRT2 can use a bit shifter in place of a multiplier having a large number of gates.

FIG. 15 is a view of the frequency characteristics of a two-stage configuration FIR filter according to the present invention and a one-stage configuration conventional FIR filter having a tap number of 31 and having cut-off frequencies of 3 MHz.

In FIG. 15, the curve indicated by the broken line shows the frequency characteristic of the FIR filter of the present application, while the curve indicated by the solid line shows the frequency characteristic of the conventional FIR filter.

As shown in FIG. 15, the FIR filter according to the present invention eliminates the multiplier and greatly reduces the number of gates by limiting the coefficients of the FIR filter and the sum of the same to a power of 2, yet despite this can give a better frequency characteristic by the same extent of tap number compared with an ideal FIR filter having a large valid number of digits (for example, 6 digits) of the coefficients by employing a two-stage configuration of a front stage and a rear stage.

In other words, in the FIR filter according to the present invention, even if reducing the number of gates by limiting the coefficients and the sum of the same to a power of 2, it is possible to obtain the desired characteristic by the method of selection of the coefficients and the method of configuration of the stages.

An FIR filter having the above characteristics can be applied as a band limiting low pass filter of the luminance signal Y or the color difference signals Cb and Cr in a digital video encoder as in the present embodiment because of its nature of a constant group delay (that is, the signal waveform is not broken).

The digital-to-analog converter (DAC) 152 converts the luminance signal Y14 output from the delay circuit 1514 of the encoding unit 151 from a digital signal to an analog signal and outputs the same as the luminance signal Y152 to the Y trap circuit 154, selector 155, and level adjustment circuit 157.

The digital-to-analog converter 153 converts the color signal C15 output from the modulation circuit 1515 of the encoding unit 151 from a digital signal to an analog signal and outputs the same as the color signal C153 to the combining circuit 156 and the level adjustment circuit 157.

The Y trap circuit 154 receives the analog luminance signal Y152 from the digital-to-analog converter 152, eliminates the frequency component of the color signal C153 included in the luminance signal Y152, and outputs the remainder as the luminance signal Y154 to the selector 155.

FIG. 16 is a circuit diagram of an example of the configuration of the Y trap circuit 154 according to the present embodiment.

As shown in FIG. 16, this Y trap circuit 154 is configured by a band pass filter (BPF) 1541 and subtractor 1542.

The band pass filter 1541 receives, for example, a burst flag BF indicating the burst section of the luminance signal Y and controls the amplitude characteristic of the band pass filter in accordance with the level of the burst flag BF.

The center frequency of the band pass filter 1541 is set at the frequency of the C signal, that is, the frequency of the color sub carrier. The frequency of the color sub carrier is 3.58 MHz in the NTSC signal system and 4.43 MHz in the PAL signal system.

The band width of the band pass filter 1541 is within a range of ±500 kHz from the center frequency. Note that, the frequency band of ±500 kHz from the frequency of the color sub carrier corresponds to the chroma band of the luminance signal Y.

The digital video encoder 15 usually combines the luminance signal Y and the color signal C to generate the composite video signal Sc, therefore the S/N ratio of the C signal is degraded due to the influence of the noise of the chroma band of the luminance signal Y.

Therefore, the luminance signal Y and the output signal of the band pass filter 1541 are subtracted from each other by the subtractor 1542.

Due to this, the noise of the chroma band in the luminance signal Y is reduced, and the S/N ratio of the color signal C in the composite video signal Sc generated by the combining circuit (mixer) 156 combining the luminance signal Y with the color signal C is enhanced.

A transfer function T(s) of the trap circuit configured by the band pass filter 1541 and the subtractor 1542 can be expressed by the following equation:

$$T(s) = 1 - H(s) = 1 - -\frac{(\omega_0/Q)s}{s^2(w_0/Q)s + w_0^2} = -\frac{s^2 + w_0^2}{s^2 + (w_0/Q)s + w_0^2}$$

Note that H(s) in equation (1) is the transfer function of the band pass filter 1541. The transfer characteristic of the trap circuit shown in equation (1) substantially matches the transfer characteristic of a notch filter. This shows that the trap circuit can be configured by a notch filter.

In order to directly process a wide band Y signal, severe demands are made on the bandwidth, phase distortion characteristics, etc. of the notch filter. In the present embodiment, by configuring the Y trap circuit by the band pass filter 1541 and subtractor 1542 in place of a notch filter, the trap characteristic is realized by the subtraction of the luminance signal Y and the noise component extracted at the band pass filter 1541 and the distortion of the Y signal can be kept to a minimum.

FIGS. 17A to 17E show the waveforms of the color signal C, luminance signal Y, burst flag BF, and composite video signal Sc and the characteristics of the trap circuit.

Figure 17:
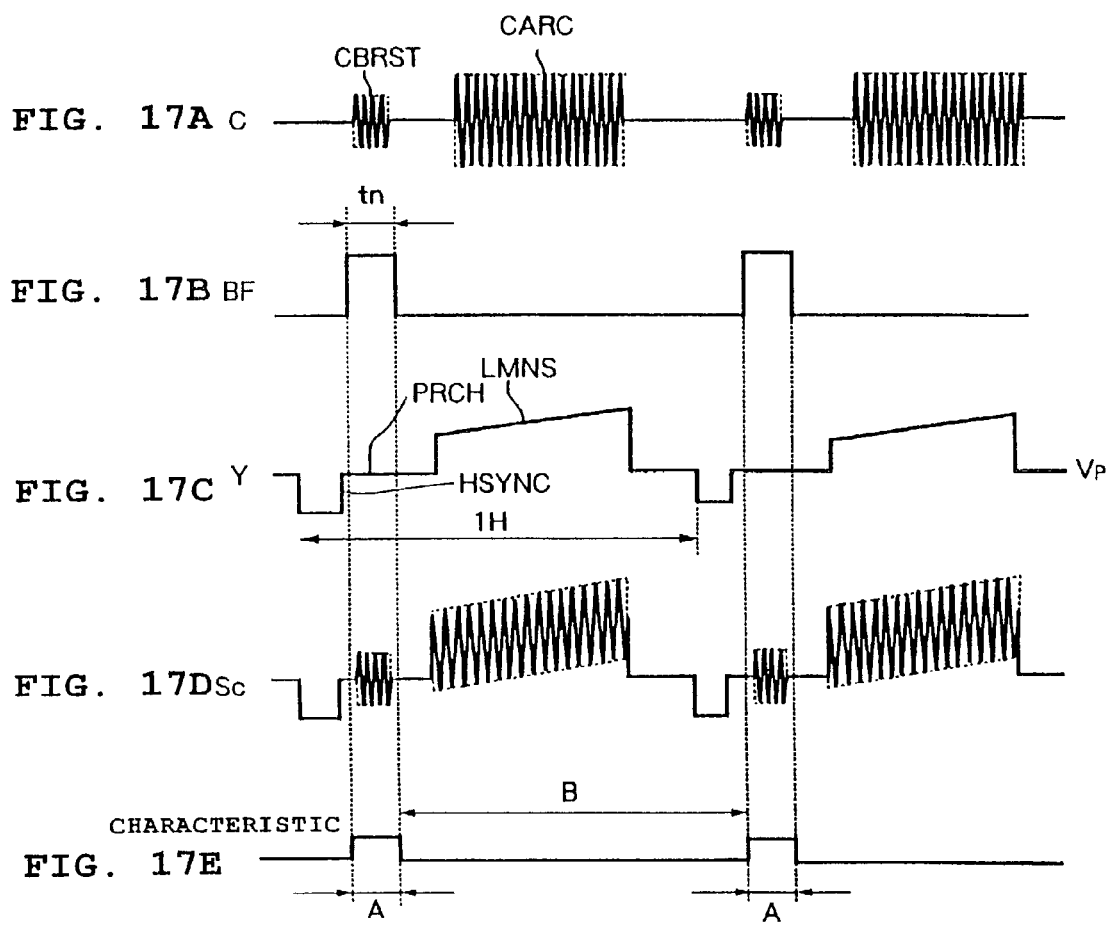

The color signal C includes, as shown in FIG. 17A, the color burst signal CBRST and the carrier color signal CARC. The luminance signal Y includes, as shown in FIG. 17C, the horizontal synchronization signal HSYNC and the video luminance signal LMNS.

As shown in FIG. 17B, the burst flag BF is held at the high level during a time tB including the color burst signal of the color signal C and is held at the low level during other times.

Also, the luminance signal Y is divided by the horizontal synchronization signal HSYNC as shown in FIG. 17C. The period of the horizontal synchronization signal HSYNC is 1H as illustrated. In the NTSC signal system, one period of the horizontal synchronization signal is 63.5 microseconds (fÊs).

The characteristic of the band pass filter 1541 is controlled in accordance with the burst flag BF, therefore the attenuation characteristic of the Y trap circuit 154 configured by the band pass filter 1541 and the subtractor 1542 is also controlled in accordance with the burst flag BF.

FIG. 18 is a view of the attenuation characteristic of the Y trap circuit.

In FIG. 18, the characteristic A is the characteristic of a section where the burst flag BF is held at the high level, that is, a portion A in FIG. 17E, and the characteristic B is the characteristic of a section where the burst flag BF is held at the low level, that is, a portion B in FIG. 17E.

As shown in FIG. 18, the characteristic of the Y trap circuit 154 is controlled so as to change in accordance with the burst flag BF.

When the burst flag BF is at the high level, the attenuation of the Y trap circuit 154 is set to a large value. At the center frequency. 3.58 MHz, an attenuation of a maximum 49.02 dB is given.

On the other hand, when the burst flag BF is at the low level, the attenuation is set to a small value. At the center frequency 3.58 MHz, an attenuation of a maximum 2.99 dB is given.

As shown in FIGS. 17B and 17D, when the burst flag BF is held at the high level, the color burst signal CBRST of the color signal C is superimposed on the back porch PRCH of the luminance signal Y.

In this section, there is no video luminance signal LMNS of the luminance signal Y. By setting the attenuation large with respect to the luminance signal Y, the noise elimination effect of the chroma band is raised. In addition, there is almost no influence upon the video luminance signal LMNS.

As shown in FIGS. 17B and 17D, when the burst flag BF is held at the low level, the carrier color signal CARC of the color signal C is superimposed on the video luminance signal LMNS of the luminance signal Y.

In this section, since there is the video luminance signal LMNS of the Y signal, by setting the attenuation characteristic of the Y trap circuit 154 low, the influence upon the video luminance signal LMNS is reduced.

According to the present embodiment, by configuring the Y trap circuit 154 by the band pass filter 1541 and the subtractor 1542, the noise component of the chroma band of the luminance signal Y is attenuated. Further, the attenuation characteristic of the trap circuit is controlled in accordance with the burst flag BF to set the attenuation of the trap circuit in the burst section to a large value and to set the attenuation in the other sections to a small value. Therefore, when combining the luminance signal Y with the color signal C at the later combining circuit 156 to obtain the composite video signal Sc, a great attenuation of the noise component in the burst section can be realized without any influence on the luminance signal Y, and the S/N ratio of the C signal can be enhanced.

The selector 155 selects either the luminance signal Y154, which eliminates the color sub carrier frequency component by the Y trap circuit 154, or the luminance signal Y152, which is output from the digital-to-analog converter 152, does not pass through the Y trap circuit 154, and is not subjected to processing to eliminate the color sub carrier frequency component in accordance with the control signal CTL by the main processor 11, and outputs the same to the combining circuit 156.

Concretely, according to the instruction of the control signal CTL from the main processor 11, the selector 155 selects the luminance signal Y152 output from the digital-to-analog converter 152 when, for example, processing a natural image in order that the cross-color effect is not so noticeable and so that deterioration of the image quality due to the Y trap may be avoided. Conversely, the selectors 155 also selects the luminance signal Y154 from the Y trap circuit 154 when processing a three-dimensional computer graphic rendered by the rendering circuit 16 in order that the influence of the cross-color effect is large, and supplies the same to the combining circuit 156.

The combining circuit 156 combines the luminance signal Y152 or Y154 selected by the selector 155 with the color signal C15 from the modulation circuit 1515 of the encoding unit 151 and outputs the composite video signal CVBS to the level adjustment circuit 157.

The level adjustment circuit 157 adjusts the output levels of the input luminance signal Y152, color signal C153, and composite video signal CVBS by adding DC offset in accordance with the value SV set in advance in a register or the like and outputs the results to the display device 17 to display the natural image or three-dimensional computer graphics.

FIG. 19 is a view of an example of the relationship of the setting value SV and the adjustment level in the level adjustment circuit.

As shown in FIG. 19, the level adjustment circuit 157 outputs a signal of the level near the minimum value when for example the setting value SV is "0".

The level adjustment circuit 157 outputs a signal of an intermediate level higher than the minimum value level when the setting value SV is "1".

The level adjustment circuit 157 outputs a signal higher than the intermediate level when the setting value SV is "2".

The rendering circuit 16 passes the video data 11a as it is and supplies the same to the digital video encoder 15 when the data input through the main bus 18 is a natural image reproduced from the digital versatile disk apparatus 12.

The rendering circuit 16 performs predetermined rendering when the data input through the main bus 18 is polygon rendering data S11b including the three-dimensional coordinates (x, y, z), R (red), G (green), and B (blue) data, homogeneous coordinates (s, t) of the texture, and the homogeneous term q for the vertexes of the unit graphic and supplies the rendered three-dimensional computer graphics data to the digital video encoder 15.

The rendering circuit 16 has a storage circuit, for example, a DRAM, for storing the display data and the texture data required by at least one graphic element and a logic circuit provided with at least an interpolated data generation circuit for interpolating the polygon rendering data of the vertexes of a unit graphic to generate interpolated data of a pixel positioned in the unit graphic and a texture processing circuit for dividing the homogeneous coordinates (s, t) of the texture included in the interpolated data by a homogeneous term q to generate "s/q" and "t/q", reading texture data from the storage circuit by using a texture address corresponding to "s/q" and "t/q", and performing processing to apply the texture data to the surface of the graphics element of the display data. Namely, the rendering circuit 16 comprises the storage circuit and the logic circuit accommodated in one semiconductor chip.

FIG. 20 is a block diagram of an example of the configuration of the rendering circuit 16 according to the present embodiment.

As shown in FIG. 20, the rendering circuit 16 has a digital differential analyzer (DDA) set-up circuit 161, triangle DDA circuit 162, texture engine circuit 163, memory interface (I/F) circuit 164, CRT control circuit 165, output circuit 166, DRAM 167, and SRAM (static RAM) 168.

The rendering circuit 16 in the present embodiment is obtained, as mentioned above, by combining the logic circuit and the DRAM 167 for storing at least the display data and the texture data in one semiconductor chip.

DRAM 167

The DRAM 167 acts as a texture buffer 167a, display buffer 167b, z-buffer 167c, and texture CLUT (color look up table) buffer 167d.

The DRAM 167 is divided into a plurality of (four, eight, or the like) modules having identical functions.

In the present embodiment, the DRAM 167 is divided into for example, as shown in FIG. 21, four DRAM modules 1671 to 1674. Each of the DRAM modules 1671 to 1674 has, for example, 512 page addresses (row addresses).

The memory I/F circuit 164 is provided with memory controllers 1641 to 1644 corresponding to the DRAM modules 1671 to 1674 and with a distributor 1645 for distributing the data to these memory controllers 1641 to 1644.

The memory I/F circuit 164 arranges pixel data so that an adjacent portion in the display region becomes in a different DRAM module as shown in FIG. 21 among the DRAM modules 1671 to 1674.

By this, when generating plane figures like triangles, they can be simultaneously processed on the plane, so the probability of operation of each DRAM module becomes very high.

Also, in order to store more texture data, the DRAM 167 stores indexes in the index color and color look-up table values for the same in the texture CLUT buffer 167d.

The indexes and the color look-up table values are used for the texture processing. Namely, usually a texture element is expressed by a total of 24 bits, comprising 8 bits each of R, G, and B. However, the amount of data may swell, such that one color may be selected from among, for example, 256 colors selected in advance, and the data thereof may be used for the texture processing. By this, if there are 256 colors, each texture element can be expressed by 8 bits. A conversion table from the index to the actual color becomes necessary, but the higher the resolution of the texture, the more compact the texture data obtained.

Due to this, compression of the texture data becomes possible, and efficient utilization of the built-in DRAM 167 becomes possible.

Further, the DRAM 167 stores depth information relating to the object to be drawn in order to perform hidden plane processing simultaneously and in parallel with the drawing.

Note that, as a method of storing the display data, the depth data, and the texture data, the display data is stored continuously from the top of the memory block, then the depth data is stored, then the texture data is stored in continuous address spaces for each type of texture in the remaining vacant regions. By this, the texture data can be stored efficiently. Memory I/F circuit 164

The memory I/F circuit 164 compares the z-data corresponding to the pixel data S163 input from the texture engine circuit 163 with the z-data stored in the z-buffer 167c, judges whether or not the image generated by the input pixel data S163 is positioned closer (to the viewing point) than the image written in the display buffer 167b the previous time, and, when judging that it is positioned closer, updates the z-data stored in the z-buffer 167c by the z-data corresponding to the image data S163.

Also, the memory I/F circuit 164 writes (enters) the (R, G, B) data to the display buffer 167b.

Note that the memory I/F circuit 164 accesses the DRAM 167 for 16 pixels simultaneously.

DDA set-up circuit 161

Before the later triangle DDA circuit 162 linearly interpolates the values of the vertexes of a triangle in a physical coordinate system to obtain information of the color and depth of pixels inside the triangle, the DDA set-up circuit 161 performs a set-up operation for obtaining the difference with a side of the triangle in the horizontal direction etc. for the data (z, R, G, B, s, t, q) indicated by the polygon rendering data S11.

Specifically, this set-up operation uses values of a starting point and an end point and the distance between the starting point and end point to calculate the change of values being sought in the case of movement by a unit length.

The DDA set-up circuit 161 outputs the calculated change data S161 to the triangle DDA circuit 162. Triangle DDA circuit 162

The triangle DDA circuit 162 uses the change data S161 input from the DDA set-up circuit 161 to calculate the linearly interpolated (z, R, G, B, s, t, q) data for each pixel inside the triangle.

The triangle DDA circuit 162 outputs the data (x, y) for each pixel and the (z, R, G, B, s, t, q) data at the (x, y) coordinates to the texture engine circuit 163 as the DDA data (interpolated data) S162.

For example, the triangle DDA circuit 162 outputs the DDA data S162 of the 8 (=2×4) pixels positioned inside a block being processed in parallel to the texture engine circuit 163.

Texture engine circuit 163

The texture engine circuit 163 performs the calculation of "s/q" and "t/q", the calculation of the texture coordinate data (u, v), and the reading of the (R, G, B) data from the texture buffer 167a in a pipeline format.

Note that, the texture engine circuit 163 performs the processing on the 8 pixels positioned inside a predetermined block simultaneously in parallel.

The texture engine circuit 163 performs the operation for dividing the data s by the data q and the operation for dividing the data t by the data q on the (s, t, q) data indicated by the DDA data S162.

The texture engine circuit 163 is provided with, for example, eight division circuits, not illustrated, and performs the division "s/q" and "t/q" simultaneously on the 8 pixels.

Also, the texture engine circuit 163 multiplies the texture sizes USIZE and VSIZE with the division results "s/q" and "t/q" to generate the texture coordinate data (u, v).

Also, the texture engine circuit 163 outputs a read request including the generated texture coordinate data (u, v) to the SRAM 168 or DRAM 167 via the memory I/F circuit 164. The texture engine circuit 163 obtains the (R, G, B) data S168 stored at the texture address corresponding to the (s, t) data by reading the texture data stored in the SRAM 168 or in the texture buffer 167a via the memory I/F circuit 164.

Here, the texture data stored in the texture buffer 167a is stored in the SRAM 168 as explained above.

The texture engine circuit 163 generates pixel data S163 by multiplying etc. the (R, G, B) data in the read (R, G, B) data S168 and the (R, G, B) data included in the DDA data S162 from the former triangle DDA circuit 162.

The texture engine circuit 163 outputs this pixel data S163 to the memory I/F circuit 164.

Note that the texture buffer 167a stores the MIPMAP (texture for a plurality of resolutions) and other texture data corresponding to a plurality of reducing rates. Here, which reducing rate texture data is used is determined in the above triangular units using a predetermined algorithm.

In the case of a full color mode, the texture engine circuit 163 directly uses the (R, G, B) data read from the texture buffer 167a.

On the other hand, in the case of an index color mode, the texture engine circuit 163 reads a color look-up table (CLUT), prepared in advance, from the texture CLUT buffer 167d, transfers and stores the same in the built-in SRAM, and uses the color look-up table to obtain the (R, G, B) data corresponding to the color index read from the texture buffer 167a.

CRT control circuit 165

The CRT control circuit 165 generates an address for display on a CRT (not shown) in synchronization with given horizontal and vertical synchronization signals and outputs a request for reading the display data from the display buffer 167b to the memory I/F circuit 164. In response to this request, the memory I/F circuit 164 reads a certain amount of the display data from the display buffer 167b. The CRT controller circuit 165 has a built-in first-in first-out (FIFO) circuit for storing the display data read from the display buffer 167b and outputs the index value of RGB to the output circuit 166 at certain time intervals.

Output circuit 166

The output circuit 166 stores the R, G, B data corresponding to the index values. It generates R, G, B data of a digital format corresponding to the index value of RGB input from the CRT controller circuit 165. The output circuit 166 outputs the generated R, G, B data to the digital video encoder 15.

Next, the operation of the overall image processing system of FIG. 1 will be explained in connection with the case of processing a natural image and the case of processing a three-dimensional computer graphic.

When processing a natural image, the video data concerning the natural image is reproduced from the digital versatile disk device 14 and supplied via the main bus 18 to the main processor 11.

The main processor 11 outputs a control signal CTL to the digital video encoder 15 instructing it to bypass the processing by the Y trap circuit such that it enters a mode for processing a natural image. Therefore, the cross-color effect is not so noticeable and deterioration of the image quality due to the Y trap may be avoided.

Then, the video data S11a of R, G, B concerning the natural image reproduced from the digital versatile disk device 14 is transferred through the rendering circuit 16 to the digital video encoder 15.

The digital video encoder 15 inputs the video data S11a of R, G, B, and in particular the luminance signal Y and color difference signals Cb and Cr of each, to the encoding unit 151.

The encoding unit 151 extracts the low frequency component of the input luminance signal Y at the low pass filter 1511 and outputs it as a luminance signal Y11 having a characteristic of a flat pass band without ripple and having a sharp characteristic near the cut-off frequency fc to the delay circuit 1514.

The encoding unit 151 additionally extracts the low frequency component of the input color difference signal Cb at the low pass filter 1512 and outputs it as a color difference signal Cb12 having a characteristic of a flat pass band without ripple and having a sharp characteristic near the cut-off frequency fc to the modulation circuit 1515.

Similarly, the encoding unit 151 extracts the low frequency component of the input color difference signal Cr at the low pass filter 1513 and outputs it as a color difference signal Cr13 having a characteristic of a flat pass band without ripple and having a sharp characteristic near the cut-off frequency fc to the modulation circuit 1515.

The delay circuit 1514 delays the luminance signal Y11 from the low pass filter 1511 by, for example, exactly the time required for the modulation of the modulation circuit 15 and outputs the result as a luminance signal Y14 to the digital-to-analog converter 152.

The modulation circuit 1515 applies predetermined modulation to the color difference signal Cb12 from the low pass filter 1512 and the color difference signal Cr13 from the low pass filter 1513 to generate the color signal C15 and output it to the digital-to-analog converter 153.

The digital-to-analog converter 152 converts the luminance signal Y14 from a digital signal to an analog signal and outputs it as a luminance signal Y152 to the selector 155, Y trap circuit 154, and level adjustment circuit 157.

In this case, since the selector 155 is instructed by the control signal CTL from the main processor 11 to bypass the processing by the Y trap circuit 154 such that cross-color effect is not so noticeable and so that deterioration of the image quality due to the Y trap may be avoided, the selector 155 selects the output luminance signal Y152 of the digital-to-analog converter 152 irrespective of the processing of the Y trap circuit 154 and outputs the same to the combining circuit 156.

The digital-to-analog converter 153 converts the color signal Y15 from a digital signal to an analog signal and outputs this as a color signal C153 to the combining circuit 156 and the level adjustment circuit 157.

The combining circuit 156 combines the luminance signal Y152 and the color signal C153 to generate a composite video signal CVBS. The level adjustment circuit 157 adjusts the generated composite video signal CVBS in its output level to a level in accordance with the setting value SV and outputs the result to the display device 17.

The video displayed on the display device 17 becomes a video with little deterioration since video data in the composite video signal CVBS relating to a natural image wherein the cross-color effect is not noticeable is not passed through Y trap processing having the side effect of deterioration of resolution.

Next, when processing a three-dimensional computer graphics, in the image processing system 10, graphics drawing or other data is given from the main memory 12 of the main processor 11 or from the I/O interface circuit 13 receiving the graphics data from the outside to the rendering circuit 16 via the main bus 18.

The main processor 11 outputs a control signal CTL to the digital video encoder 15 instructing it to select the luminance signal Y passed through the processing by the Y trap circuit 154 since it is in a mode processing a three-dimensional computer graphics and the effect of the cross-color is large.

Note that, in accordance with need, the main processor 11 etc. performs coordinate conversion, clipping, lighting, and other geometric processing on the graphics drawing or other data.

The graphics data after the geometric processing becomes polygon rendering data S11b composed of the coordinates x, y, z of the three vertexes of a triangle, the luminance values R, G, B, the texture coordinates s, t, q corresponding to the pixel to be drawn, etc.

The polygon rendering data S11b is input to the DDA set-up circuit 161 of the rendering circuit 16.

The DDA set-up circuit 161 generates change data S161 indicating the difference of a side of the triangle from a horizontal direction etc. based on the polygon rendering data S11. Specifically, it calculates the change, that is, the amount of change of the values to be obtained in the case of movement by a unit length, by using the value of the starting point, the value of the end point, and the distance between the two and outputs it to the triangle DDA circuit 162 as change data S161.

The triangle DDA circuit 162 uses the change data S161 for calculation of the linearly interpolated data (z, R, G, B, s, t, q) of each of the pixels inside the triangle.

Then, the triangle DDA circuit 162 outputs the calculated (z, R, G, B, s, t, q) data and the (x, y) data of each of the vertexes of the triangle to the texture engine circuit 163 as DDA data S162.

The texture engine circuit 163 performs an operation for dividing the data "s" by the data "q" and an operation for dividing the data "t" by the data "q" are performed for the (s, t, q) data indicated by the DDA data S162. Then, it multiplies the texture sizes USIZE and VSIZE with the division results "s/q" and "t/q" to generate the texture coordinate data (u, v).

Next, the texture engine circuit 163 outputs a read request including the generated texture coordinate data (u, v) to the SRAM 168 via the memory I/O circuit 164 and reads the (R, G, B) data S168 stored in the SRAM 168 via the memory I/F circuit 164.

Next, the texture engine circuit 163 multiplies the (R, G, B) data in the read (R, G, B) data ~168 and the (R, G, B) data included in the DDA data S162 from the former triangle DDA circuit 162 to generate the pixel data S163.

The texture engine circuit 163 outputs this pixel data S163 to the memory I/F circuit 164.

In the case of a full color mode, the (R, G, B) data read from the texture buffer 167*a* can be directly used, while in the case of an index color mode, data in the color look-up table (CLUT), prepared in advance, is transferred from the texture CLUT buffer 167*d* to a buffer for temporary storage, which is configured by an SRAM etc. By using the CLUT of the temporary storage buffer, the actual R, G, B colors can be obtained from the color index.

Note that when the CLUT is configured by an SRAM, when a color index is input to an address of the SRAM, the actual R, G, B colors are output.

The memory I/F circuit 164 compares the z-data corresponding to the pixel data S163 input from the texture engine circuit 163 and the z-data stored in the z-buffer 167*c* for judging whether or not the image drawn by the input pixel data 163 is positioned closer (to the viewing point) than the image written in the display buffer 167*b* the previous time.

When judging that the image is positioned closer, it replaces the z-data stored in the z-buffer 167*c* by the z-data corresponding to the image data S163.

Next, the memory I/F circuit 164 writes the (R, G, B) data in the display buffer 167*b*.

The memory I/F circuit 164 calculates the memory block storing the texture corresponding to the texture address of the pixel to be drawn from the texture address, requests a read operation to only that memory block, and reads the texture data.

In this case, since memory blocks that do not store the corresponding texture data are not accessed for reading the texture, it is possible to provide more access time for the drawing operation.

In the drawing operation, in the same way, a memory block storing pixel data corresponding to a pixel address to be drawn is accessed to read the pixel data from the corresponding address for modify writing, the data is modified, then the data is written back to the same address.

When performing hidden plane processing, again in the same way, a memory block storing depth data corresponding to a pixel address to be drawn is accessed to read the depth data from the corresponding address for modify writing, the data is modified if necessary, then the data is written back to the same address.

In such transfer of data with the DRAM 167 based on the memory I/F circuit 164, performance of the drawing operation can be improved by performing the processing in parallel.

In particular, a plurality of pixels can be simultaneously calculated by partially increasing the operating frequency by providing the triangle DDA circuit 162 and the texture engine 163 portions in the same circuit in a parallel execution mode (spatial parallel) or by inserting a lot of pipelines (time parallel).

Also, the pixel data is arranged so that the adjacent portions in the display region are in different modules under the control of the memory I/F circuit 164.

Due to this, the processing is simultaneously carried out on a plane when drawing plane figures, such as triangles. Therefore, the probability of operation of the DRAM modules is quite high.

When displaying an image on a CRT (not illustrated) of the display device 17, the CRT control circuit 165 generates the display address in synchronization with the given horizontal and vertical frequencies and sends a request for transferring the display data to the memory I/F circuit 164.

The memory I/F circuit 164, in accordance with the request, transfers a certain amount of the display data to the CRT control circuit 165.

The CRT control circuit 165 stores the display data in a display (not illustrated) using FIFO (First In First Out) etc. and transfers index values of RGB to the output circuit 166 at certain intervals.

The output circuit 166 stores the RGB values with respect to RGB indexes inside the RAM, generates the RGB values with respect to the index values, and transfers this RGB signal to the digital video encoder 15.

The digital video encoder 15 inputs the video data of R, G, B according to the three-dimensional computer graphics, such as, for example, the luminance signal Y and the color difference signals Cb and Cr of each, to the encoding unit 151.

The encoding unit 151 extracts the low frequency component of the input luminance signal Y at the low pass filter 1511, then outputs it to the delay circuit 1514 as a luminance signal Y11 having a characteristic of a flat pass band with no ripple and having a sharp characteristic near the cut-off frequency fc.

Also, it extracts the low frequency component of the input color difference signal Cb at the low pass filter 1512, then outputs it to the modulation circuit 1515 as a color difference signal Cb12 having the characteristics of a flat pass band with no ripple and having a sharp characteristic near the cut-off frequency fc.

Similarly, encoding unit 151 extracts the low frequency component of the input color difference signal Cr at the low pass filter 1513, then outputs it to the modulation circuit 1515 as a color difference signal Cr13 having a characteristic of a flat pass band with no ripple and having a sharp characteristic near the cut-off frequency fc.

The delay circuit 1514 delays the luminance signal Y11 from the low pass filter 1511 by, for example, exactly the time required for the modulation of the modulation circuit 15 and outputs the result as a luminance signal Y14 to the digital-to-analog converter 152.

The modulation circuit 1515 applies predetermined modulation to the color difference signal Cb12 from the low pass filter 1512 and the color difference signal Cr13 from the low pass filter 1513 to generate the color signal C15 and outputs it to the digital-to-analog converter 153.

The digital-to-analog converter 152 converts the luminance signal Y14 from a digital signal to an analog signal and outputs it as a luminance signal Y152 to the selector 155, Y trap circuit 154, and the circuit of the next stage.

The Y trap circuit 154 receives the analog luminance signal Y152 from the digital-to-analog converter 152, eliminates the frequency component of the color signal C153 included in the luminance signal Y152, and outputs the result as a luminance signal Y154 to the selector 155.

Specifically, the luminance signal Y152 input to the input terminal T1 is input to the band pass filter 1541. The band pass filter 1541 extracts the component of the chroma band of the luminance signal Y152 by a characteristic set in accordance with the burst flag BF. Then, the subtractor 152 subtracts the output signal of the band pass filter 1541 and the luminance signal Y152 to eliminate the noise component of the chroma band of the luminance signal Y152 and outputs the result as a luminance signal Y154 to the selector 155.

In this case, the selector 155 is instructed by the control signal CTL from the main processor 11 to select the luminance signal passed through the processing by the Y trap circuit 154 since the effect of cross-color is large, and selects the output luminance signal Y154 of the Y trap circuit 154 and outputs it to the combining circuit 156.

The digital-to-analog converter 153 converts the color signal Y15 from a digital signal to an analog signal and outputs it as the color signal C153 to the combining circuit 156 and the circuit of the next stage.

Then, the combining circuit 156 combines the luminance signal Y154 and the color signal C153 to generate the composite video signal CVBS. The level adjustment circuit 157 adjusts the generated composite video signal CVBS in its output level to a level in accordance with the setting value SV and outputs the result to the display device 17.

The video displayed on the display device 17 becomes a video in the composite video signal CVBS from which the effect of cross-color has been eliminated.

As explained above, according to the present embodiment, since provision is made of the level adjustment circuit 157 for adjusting the output levels of the input luminance signal Y152, color signal C153, and composite video signal CVBS by adding DC offset in accordance with a value SV set in a register or the like in advance and outputting the results to the display device 17, a number of advantages are achieved; namely, the output levels can be adjusted and the performance of the later driver or other device can be effectively exhibited.

Also, according to the present invention, since provision is made of a selector 155 for selecting the luminance signal Y154, which was passed through the Y trap circuit 154 to eliminate its color sub carrier frequency component, or the luminance signal Y152, which was not passed through the Y trap circuit 154 but was held as it was in accordance with the control signal CTL, an additional number of advantages are achieved; namely, the user can select whether or not the Y trap processing is to be carried out according to the degree of the cross-color effect of the video and can select the optimum image quality in accordance with the raw video signal.

In particular, for video with no noticeable cross-color effect in the composite video signal, it becomes possible to enjoy the video with little deterioration by using a luminance signal that has not been subjected to the Y trap processing, which has the side effect of image resolution deterioration.

Note that, in the above embodiments, the digital video encoder, as shown in FIG. 2, was configured to have a built-in digital-to-analog converter and to perform the Y trap processing and the combining processing by analog signals, but the present invention is not limited to this. Needless to say, even a circuit 15A, for example, which does not use a digital-to-analog converter as shown in FIG. 22 and processes everything by digital signals, can be applied to the present invention.

Also, according to the present digital video encoder, since the low pass filter 1511 for the luminance signal, the low pass filter 1512 for the color difference signal Cb, and the low pass filter 1513 for the color difference signal Cr are each comprised of a front stage filter unit FRT1 having a tap number set to a value within a range where no pass band ripple occurs and the sharpness near the cut-off frequency becomes gentle, having FIR filter coefficients h (n) and the sum of the same set to values of a power of 2, passing the low frequency component of the input digital signal SIN up to the frequency fp, and outputting a signal S1 without pass band ripple and having a gentle sharpness in the vicinity of the cut-off frequency fc and a rear stage filter unit FRT2 having a tap number set to a value able to lift up the gentle portion in the pass band of the signal S1 with respect to the signal S1 from the front stage filter unit FRT1 and able to correct the characteristic near the cut-off frequency fc so that it becomes sharp, having FIR filter coefficients h (n) and the sum of the same set at values of a power of 2, and generating and outputting a signal SOUT having a characteristic of a flat pass band without ripple and a sharp characteristic near the cut-off frequency fc cascade connected, it becomes unnecessary to use the multipliers having large numbers of gates, and the overall number of gates can be decreased.

Further, there are the advantages that the degree of freedom of layout becomes greater due to the reduction of the number of gates, the maximum operation frequency becomes larger, the area per chip is reduced and consequently the yield becomes better and the profit margin is raised.

Summarizing the effects of the invention, as explained above, according to the present invention, there are the advantages that the output levels can be adjusted, and the performances of the driver and other later devices can be effectively utilized.

Also, there are the advantages such that the user can select whether or not the Y trap processing is to be carried out according to the degree of the cross-color effect of the video and can select the optimum image quality in accordance with the raw video signal.

While the invention has been described with reference to specific embodiments chosen for purpose of illustration, it should be apparent that numerous modifications could be made thereto by those skilled in the art without departing from the basic concept and scope of the invention.

What is claimed is:

1. A video encoder for combining a color signal and a luminance signal including a frequency component of the color signal to generate a composite video signal, comprising:
   a level adjustment circuit for adjusting the output level of the generated composite video signal based on a setting value;
   an encoding unit for performing predetermined filtering with respect to an input luminance signal and color signal and modulating the color signal;
   a trap circuit for removing the frequency component of the color signal included in the luminance signal output from the encoding unit and outputting the result;
   a selector for selecting either of the luminance signal output from the encoding unit or the luminance signal output from the trap circuit in accordance with a control signal; and
   a combining circuit for combining the luminance signal selected by the selector and the color signal output from the encoding unit to generate the composite video signal,
   wherein the control signal instructs the selector to select the output luminance signal of the trap circuit when the raw video has a large cross-color effect and to select the output luminance signal of the encoding unit when the cross-color effect is small, and
   wherein the trap circuit comprises:
   a band pass filter having a frequency of the carrier of the color signal as a center frequency, and
   a subtractor for subtracting the luminance signal and the output signal of the band pass filter.

2. An image processing system comprising:
   a video encoder for combining a color signal and a luminance signal including a frequency component of the color signal to generate a composite video signal, the video encoder having a level adjustment circuit for adjusting the output level of the generated composite video signal based on a setting value;

a storage circuit for storing display data and texture data required by at least one graphic element; and a logic circuit provided with at least an interpolated data generation circuit for interpolating polygon rendering data of vertexes of a unit graphic to generate interpolated data of a pixel positioned within the unit graphic and a texture processing circuit for dividing homogeneous coordinates (s, t) of texture included in the interpolated data by a homogeneous term q to generate "s/q" and "t/q", reading the texture data from the storage circuit by using a texture address corresponding to the "s/q" and "t/q", and performing processing to apply the texture data to a surface of a graphic element of the display data, the storage circuit and the logic circuit being accommodated in one semiconductor chip; and a rendering circuit receiving polygon rendering data including three-dimensional coordinates (x, y, z), R (red), G (green), and B (blue) data, homogeneous coordinates (s, t) of the texture, and the homogeneous term q for vertexes of the unit graphic, performing rendering, and outputting the result to the video encoder.

3. An image processing system as set forth in claim 2, wherein the video encoder includes:

an encoding unit for performing predetermined filtering with respect to an input luminance signal and color signal and modulating the color signal, a trap circuit for removing the frequency component of the color signal included in the luminance signal output from the encoding unit and outputting the result, a selector for selecting either the luminance signal output from the encoding unit or the luminance signal output from the trap circuit in accordance with a control signal, and a combining circuit for combining the luminance signal selected by the selector and the color signal output from the encoding unit to generate the composite video signal, and the system further comprises a main processor for outputting to the selector a control signal instructing it to select the output luminance signal of the trap circuit when the raw video has a large cross-color effect and to select the output luminance signal of the encoding unit when the cross-color effect is small.

4. An image processing system as set forth in claim 3, wherein the rendering circuit outputs video data not requiring rendering to the video encoder as it is.

5. An image processing system as set forth in claim 3, wherein the trap circuit comprises:

a band pass filter having the frequency of the carrier of the color signal as its center frequency and a subtractor for subtracting the luminance signal and the output signal of the band pass filter.

* * * * *